US010824566B2

United States Patent
Kaga et al.

(10) Patent No.: US 10,824,566 B2
(45) Date of Patent: Nov. 3, 2020

(54) STORAGE DEVICE, CONTROLLING METHOD OF STORAGE DEVICE, AND STORAGE DEVICE CONTROLLER HAVING PREDETERMINED MANAGEMENT INFORMATION INCLUDING FACE ATTRIBUTE INFORMATION, A CONTROLLER NUMBER, AND TRANSITION METHOD INFORMATION

(71) Applicant: Hitachi, Ltd., Tokyo (JP)

(72) Inventors: Takashi Kaga, Tokyo (JP); Tomohiro Nishimoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 171 days.

(21) Appl. No.: 16/083,902

(22) PCT Filed: Jul. 11, 2016

(86) PCT No.: PCT/JP2016/070382
§ 371 (c)(1),
(2) Date: Sep. 11, 2018

(87) PCT Pub. No.: WO2018/011844
PCT Pub. Date: Jan. 18, 2018

(65) Prior Publication Data
US 2019/0050337 A1    Feb. 14, 2019

(51) Int. Cl.
*G06F 12/0817*    (2016.01)
*G06F 11/20*    (2006.01)
(Continued)

(52) U.S. Cl.
CPC ...... *G06F 12/0817* (2013.01); *G06F 11/1471* (2013.01); *G06F 11/20* (2013.01);
(Continued)

(58) Field of Classification Search
CPC .. G06F 11/1441; G06F 11/1471; G06F 11/20; G06F 11/2076; G06F 11/2082;
(Continued)

(56) References Cited

U.S. PATENT DOCUMENTS 6,282,584 B1 * 8/2001 Garroussi ............ G06F 3/0607
710/15
2005/0021906 A1    1/2005 Nakamura et al.
(Continued)

FOREIGN PATENT DOCUMENTS

JP    09-146842 A    6/1997
JP    2005-043930 A    2/2005
JP    2005-122453 A    5/2005

OTHER PUBLICATIONS

International Search Report of PCT/JP2016/070382 dated Oct. 11, 2016.

*Primary Examiner* — Larry T Mackall
(74) *Attorney, Agent, or Firm* — Mattingly & Malur, PC

(57) ABSTRACT

In a storage device according to the present invention, controllers each having a cache memory manage duplication of cache data. A storage device SD includes multiple controllers 1 each including a cache memory, and multiple storing units 21 used by the controllers and configured with logical volume 24 for being provided to a higher-level device 3. Each of the controllers, in a case where a paired destination controller forming a duplication pair is blocked, selects a new paired destination controller for each logical volume, forwards the cache data stored in the cache memory included in the own controller to the new paired destination controller, and stores the cache data in a cache memory included in the new paired destination controller to duplicate the cache data.

9 Claims, 46 Drawing Sheets

(51) Int. Cl.
  *G06F 11/14* (2006.01)
  *G06F 12/0868* (2016.01)
  *G06F 12/0871* (2016.01)
  *G06F 12/0895* (2016.01)

(52) U.S. Cl.
  CPC ...... *G06F 11/2076* (2013.01); *G06F 11/2082* (2013.01); *G06F 12/0868* (2013.01); *G06F 12/0871* (2013.01); *G06F 12/0895* (2013.01); *G06F 2212/1032* (2013.01); *G06F 2212/154* (2013.01); *G06F 2212/262* (2013.01); *G06F 2212/263* (2013.01); *G06F 2212/285* (2013.01); *G06F 2212/286* (2013.01); *G06F 2212/312* (2013.01)

(58) Field of Classification Search
  CPC ............. G06F 11/2089; G06F 11/3034; G06F 11/3055; G06F 12/0817; G06F 12/0868; G06F 12/0871; G06F 12/0895; G06F 2212/1032; G06F 2212/154; G06F 2212/262; G06F 2212/263; G06F 2212/285; G06F 2212/286; G06F 2212/312
  See application file for complete search history.

(56) References Cited

U.S. PATENT DOCUMENTS

2005/0097402 A1   5/2005  Baba
2017/0220249 A1*  8/2017  Jibbe ................... G06F 11/0727

* cited by examiner

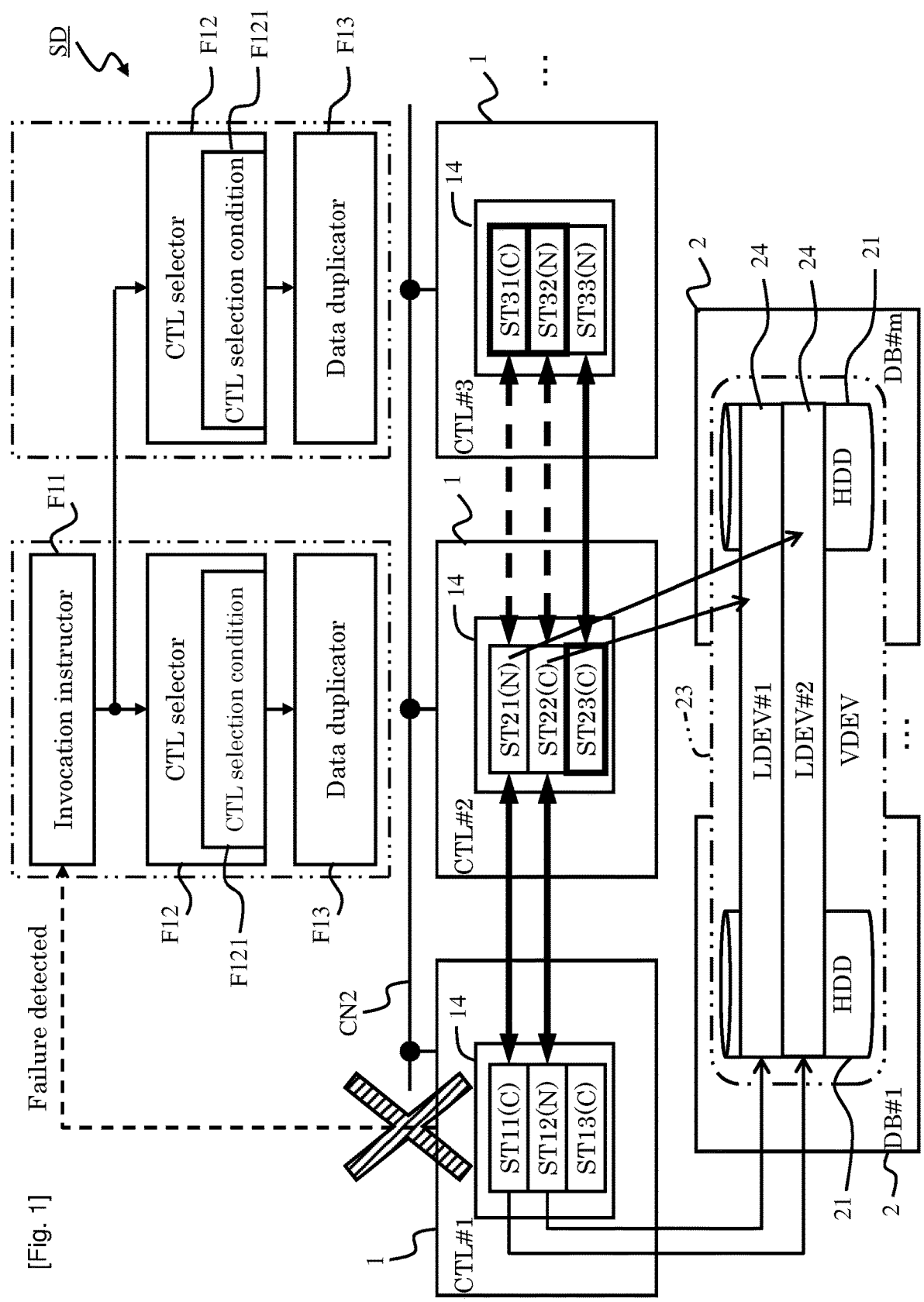
[Fig. 1]

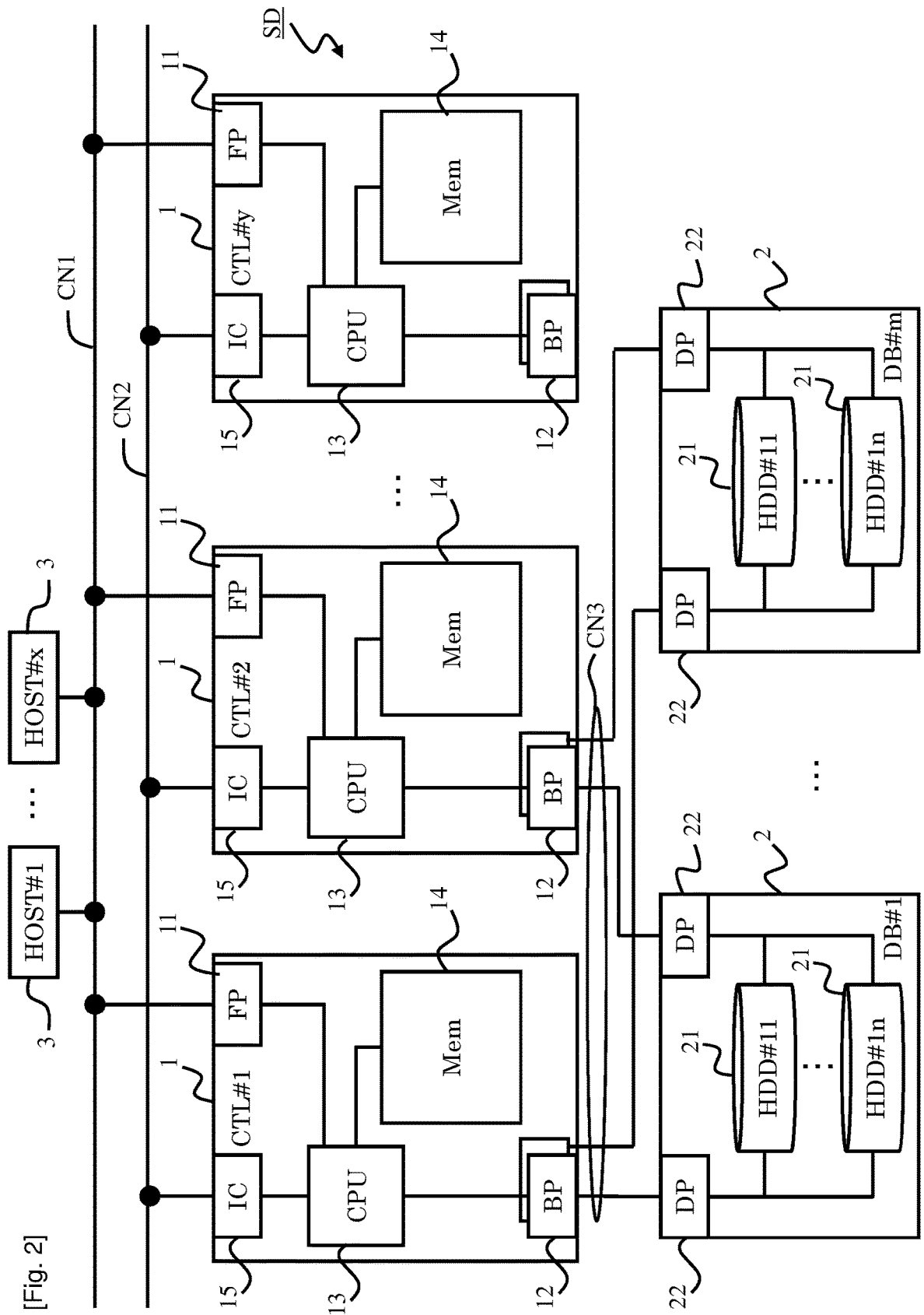

[Fig. 3]
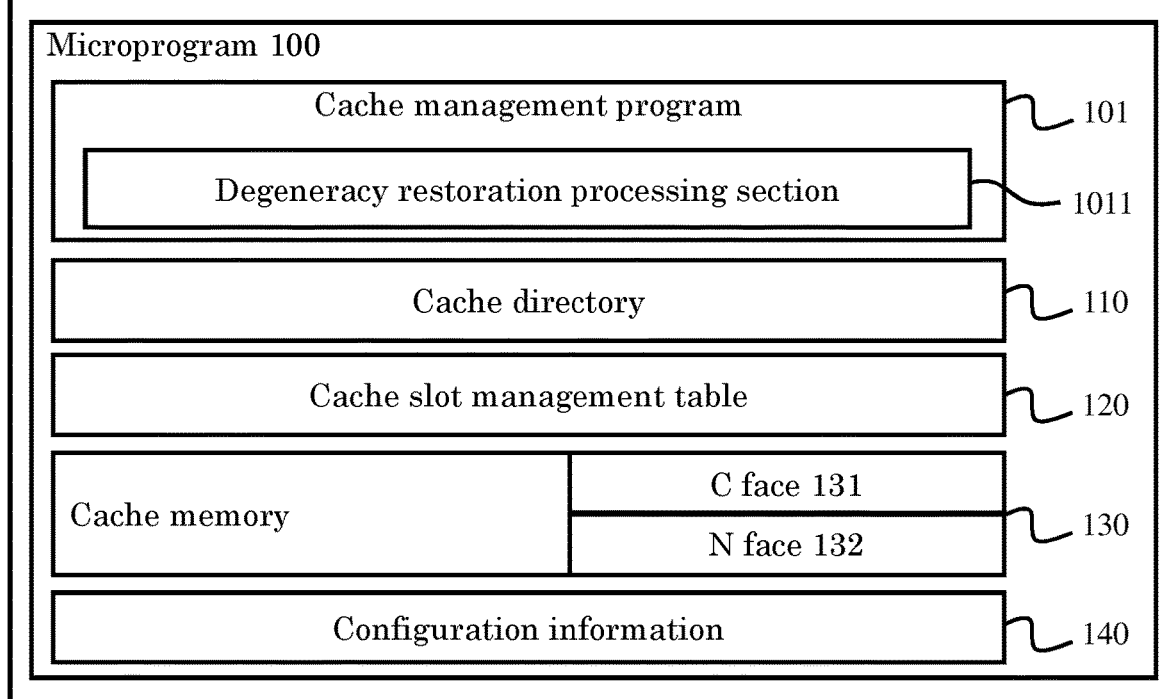

[Fig. 4]
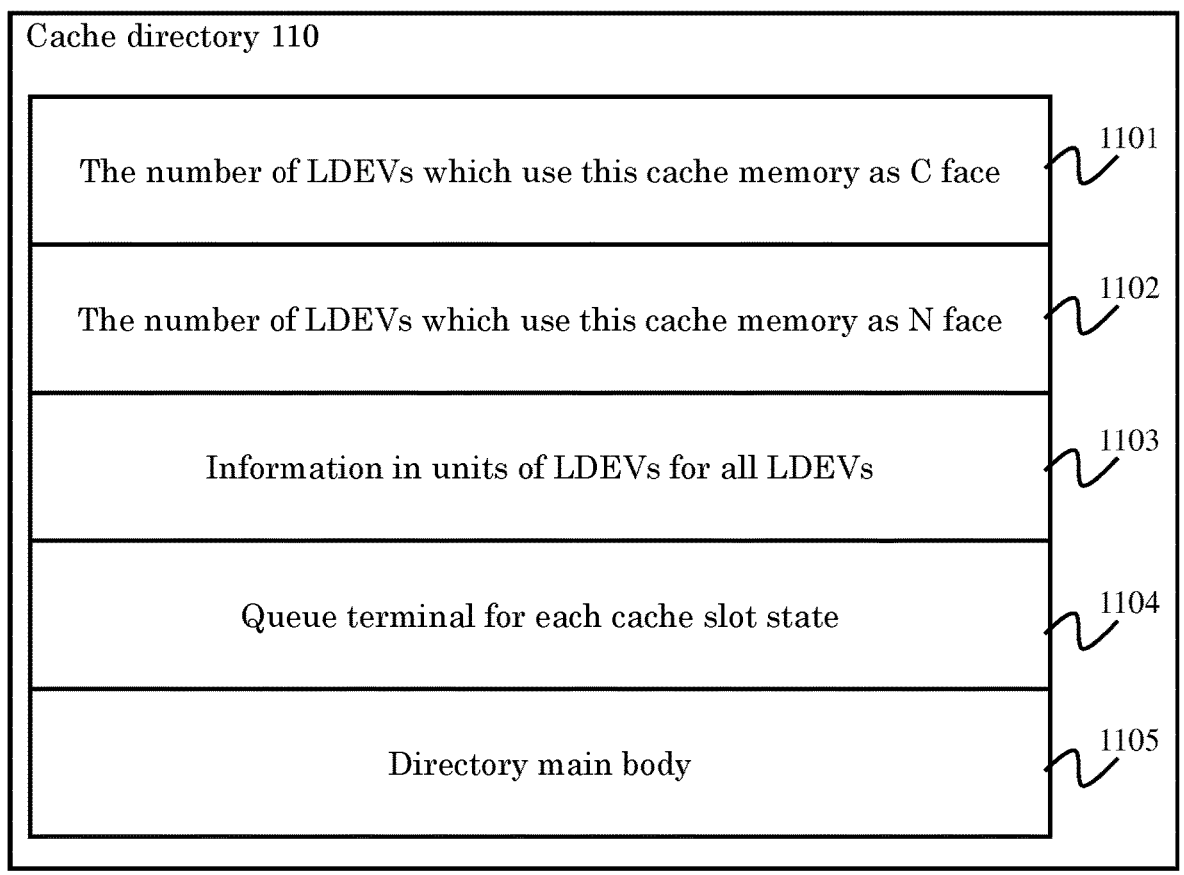

[Fig. 5]
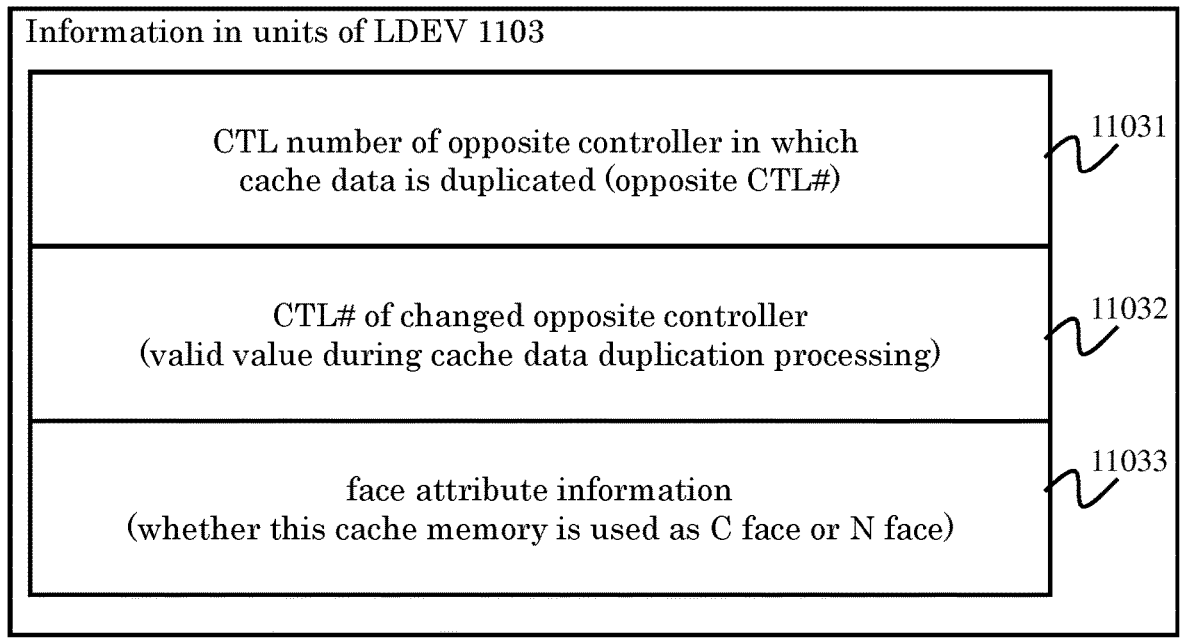

[Fig. 6]
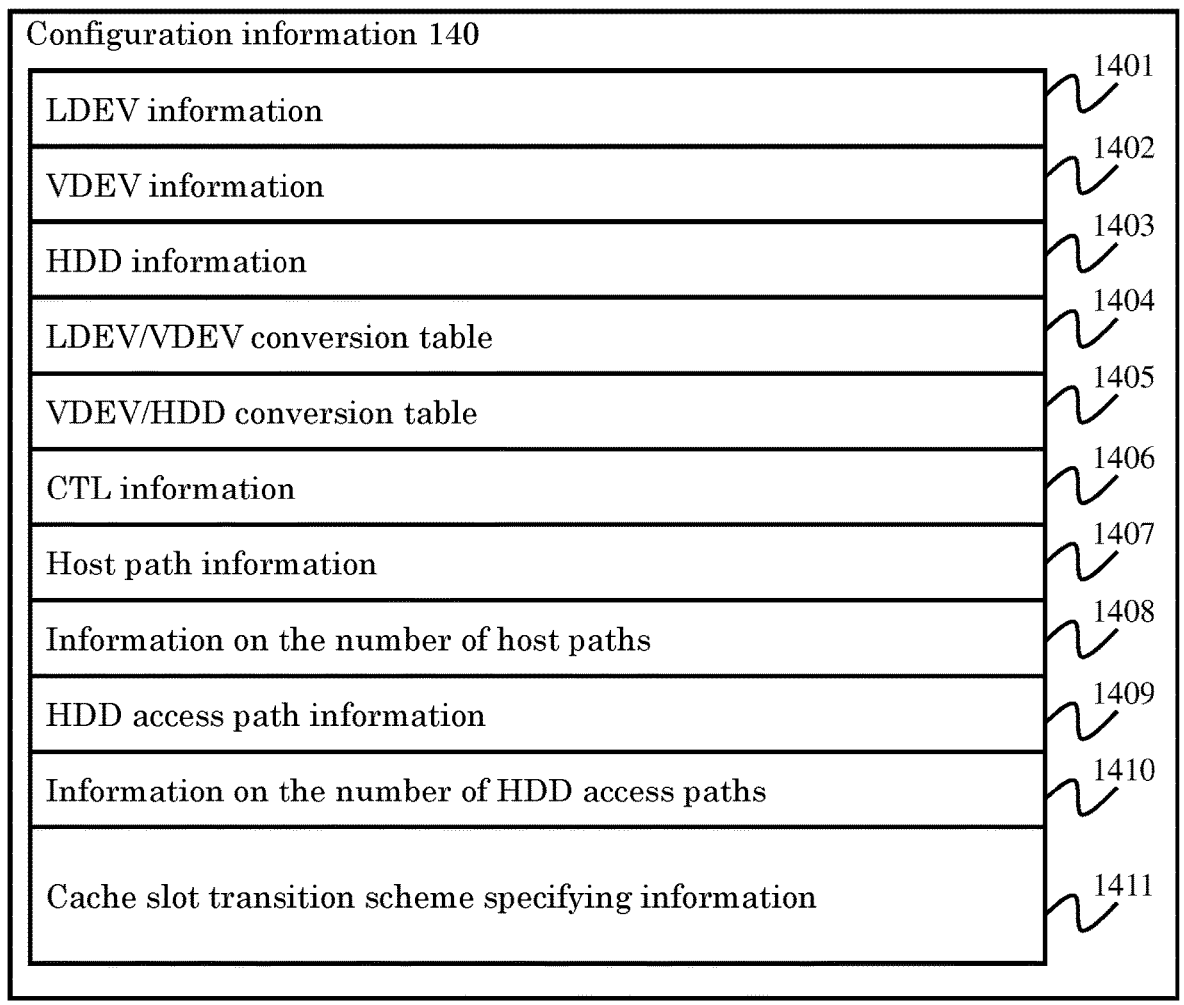

[Fig. 7]
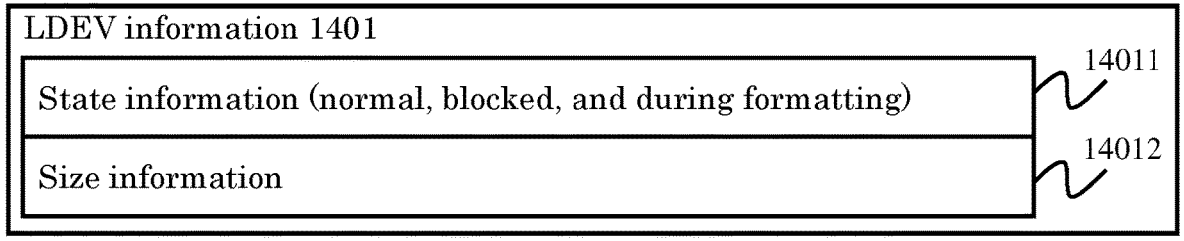

[Fig. 8]
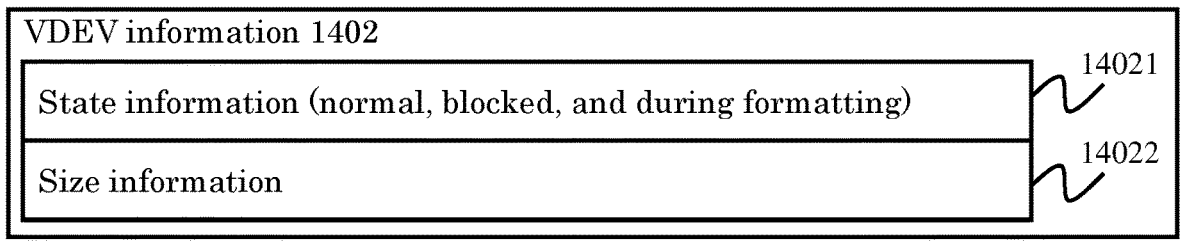

[Fig. 9]
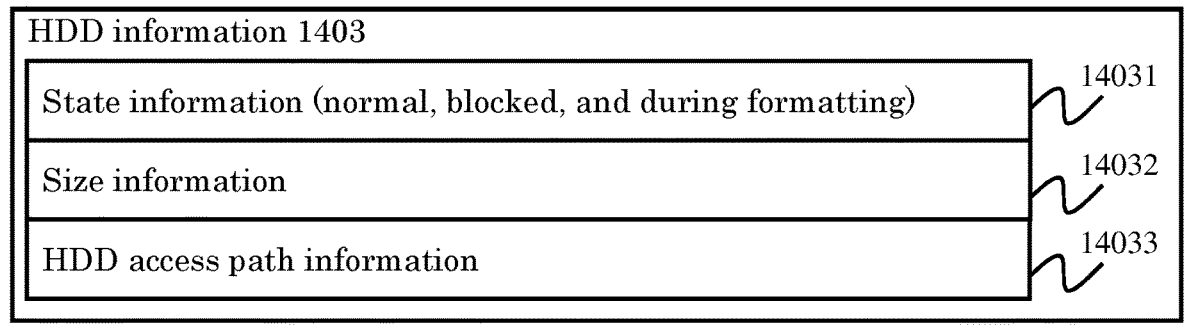

[Fig. 10]
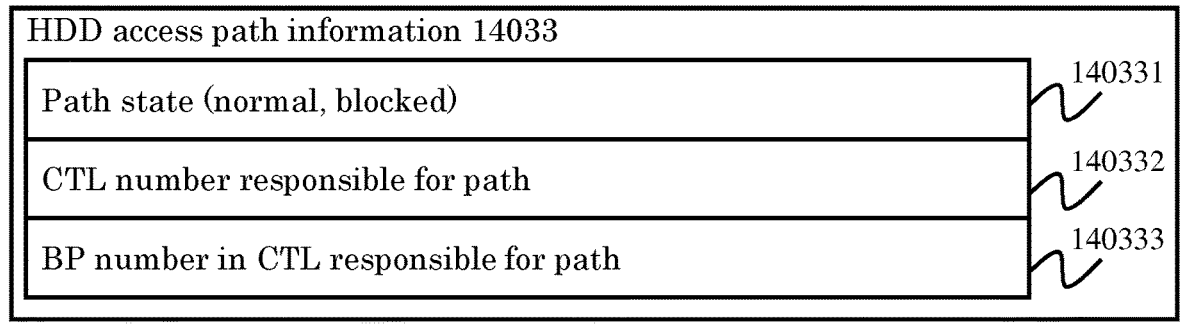

[Fig. 11]

| LDEV/VDEV conversion table 1404 |
| --- |
| LDEV list terminal information per VDEV — 14041 |
| List main body information per LDEV — 14042 |

[Fig. 12]

| LDEV list terminal information per VDEV 14041 | |
|---|---|
| Head number of LDEV list associated with this VDEV | 140411 |
| Length of LDEV list | 140412 |

[Fig. 13]

| List main body information per LDEV 14042 |
|---|
| Associated-VDEV number — 140421 |
| Subsequent-LDEV number in LDEV list (invalid number is set in case of last LDEV in list) — 140422 |

[Fig. 14]

| VDEV/HDD conversion table 1405 | |
|---|---|
| HDD list terminal information per VDEV | 14051 |
| List main body information per HDD | 14052 |

[Fig. 15]

| HDD list terminal information per VDEV 14051 | |
|---|---|
| Head number of HDD list associated with this VDEV | 140511 |
| Length of HDD list | 140512 |

[Fig. 16]

| List main body information per HDD 14052 |
|---|
| Associated-VDEV number  ~140521 |
| Subsequent-HDD number in HDD list<br>(invalid number is set in case of last HDD in list)  ~140522 |

[Fig. 17]

| CTL information 1406 | |
|---|---|
| CTL state<br>(normal, during transition to blocked state, blocked) | 14061 |

[Fig. 18]
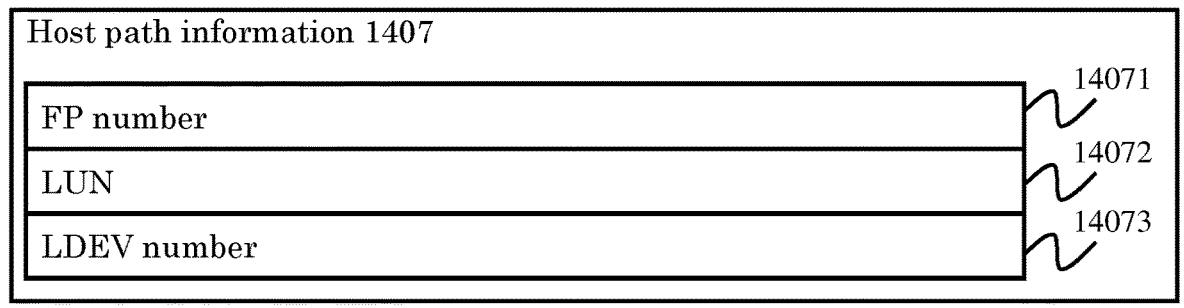

[Fig. 19]

| Information on the number of host paths 1408 | | | | |
|---|---|---|---|---|
| | CTL#1 | CTL#1 | CTL#1 | ・・・ |
| LDEV#0001 | Nah1 | Nah2 | Nah3 | ・・・ |
| LDEV#0002 | Nah4 | Nah5 | Nah6 | ・・・ |
| LDEV#0003 | Nah7 | Nah8 | Nah9 | ・・・ |
| ・・・ | ・・・ | ・・・ | ・・・ | ・・・ |

[Fig. 20]

| Information on the number of HDD access paths 1410 | | | | |
|---|---|---|---|---|
|  | CTL#1 | CTL#1 | CTL#1 | ... |
| LDEV#0001 | Nah1 | Nah2 | Nah3 | ... |
| LDEV#0002 | Nah4 | Nah5 | Nah6 | ... |
| LDEV#0003 | Nah7 | Nah8 | Nah9 | ... |
| ... | ... | ... | ... | ... |

[Fig. 21]

| Cache slot transition scheme specifying information 1411 ||
| 14111 | 14112 |
| LDEV number | Transition scheme |
|---|---|
| LDEV#0001 | Mode 1 |
| LDEV#0002 | Mode 2 |
| LDEV#0003 | Mode 3 |
| . . . | . . . |
| LDEV#000n | Mode n |

[Fig. 22]
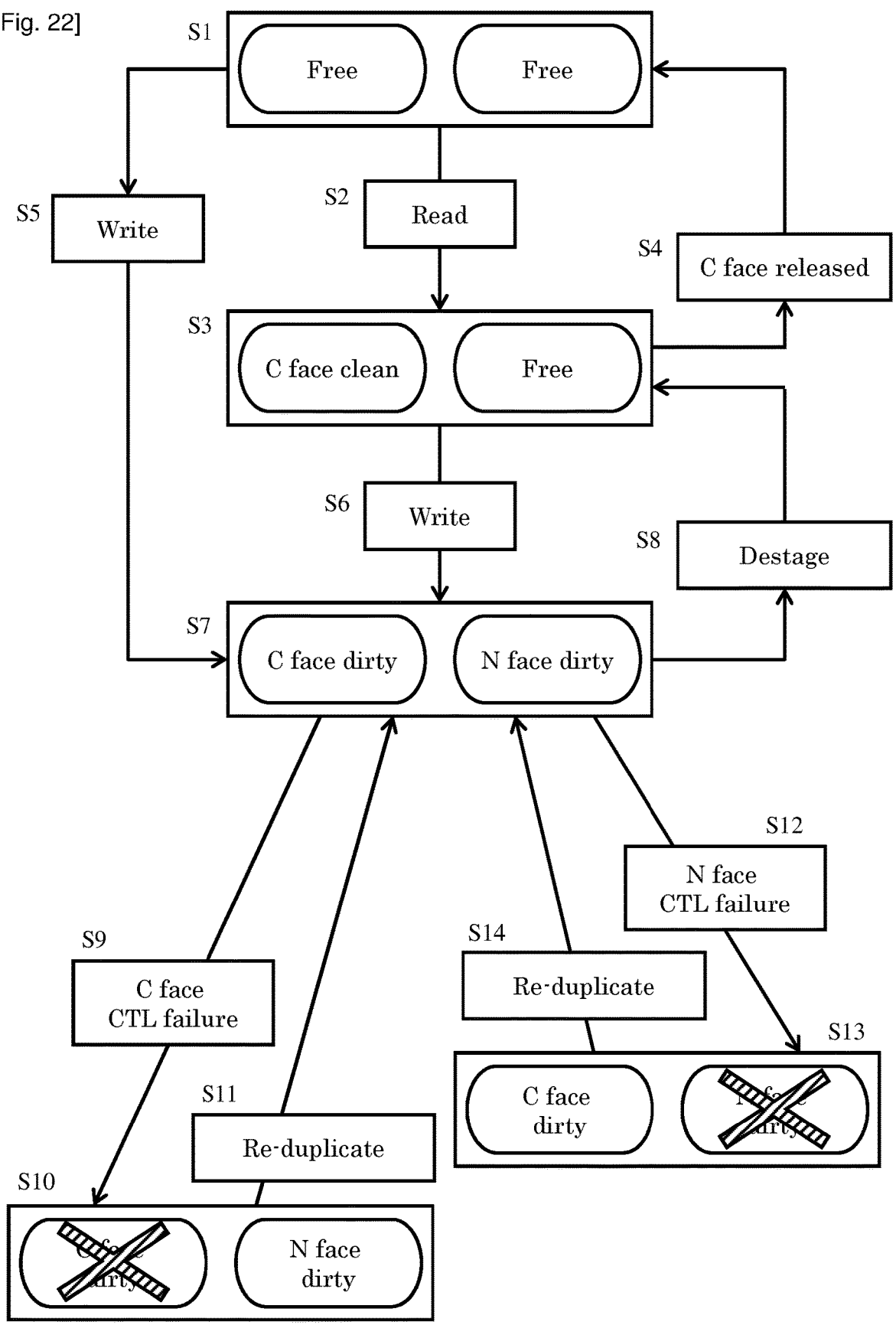

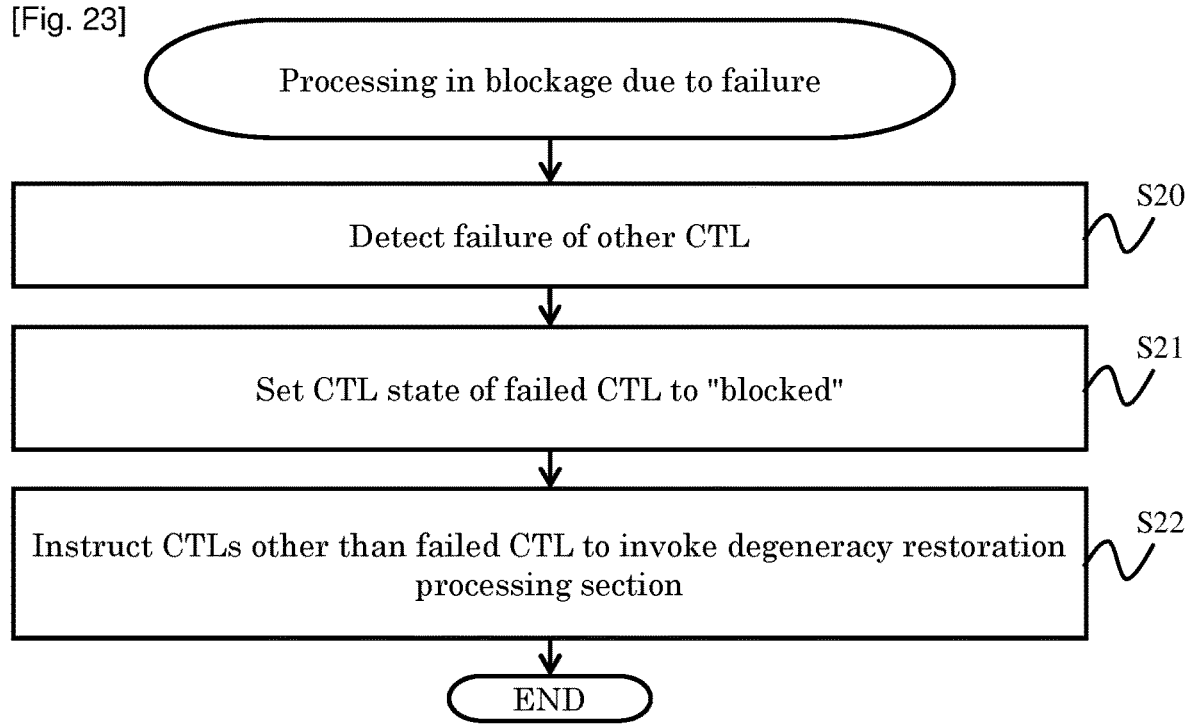
[Fig. 23]

[Fig. 24]
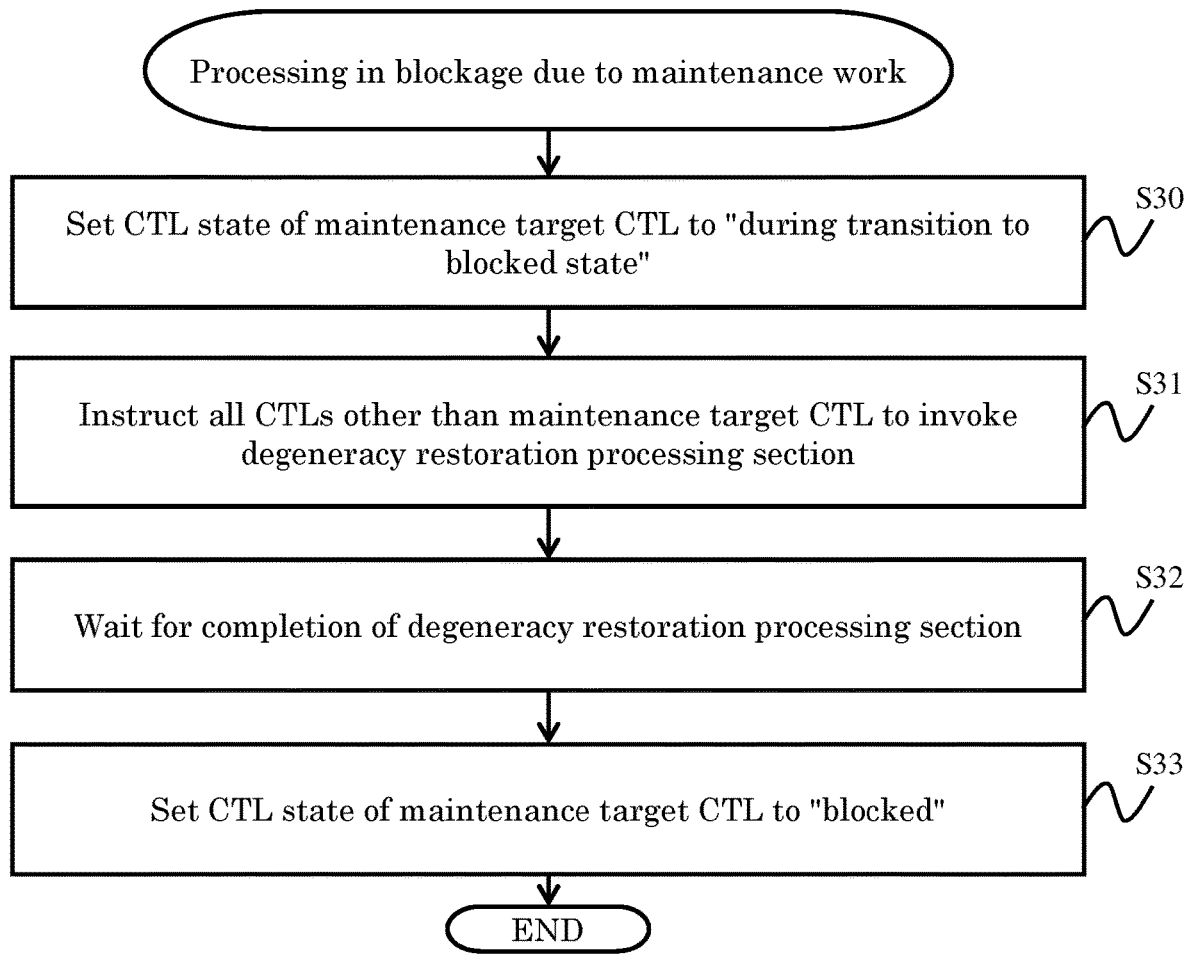

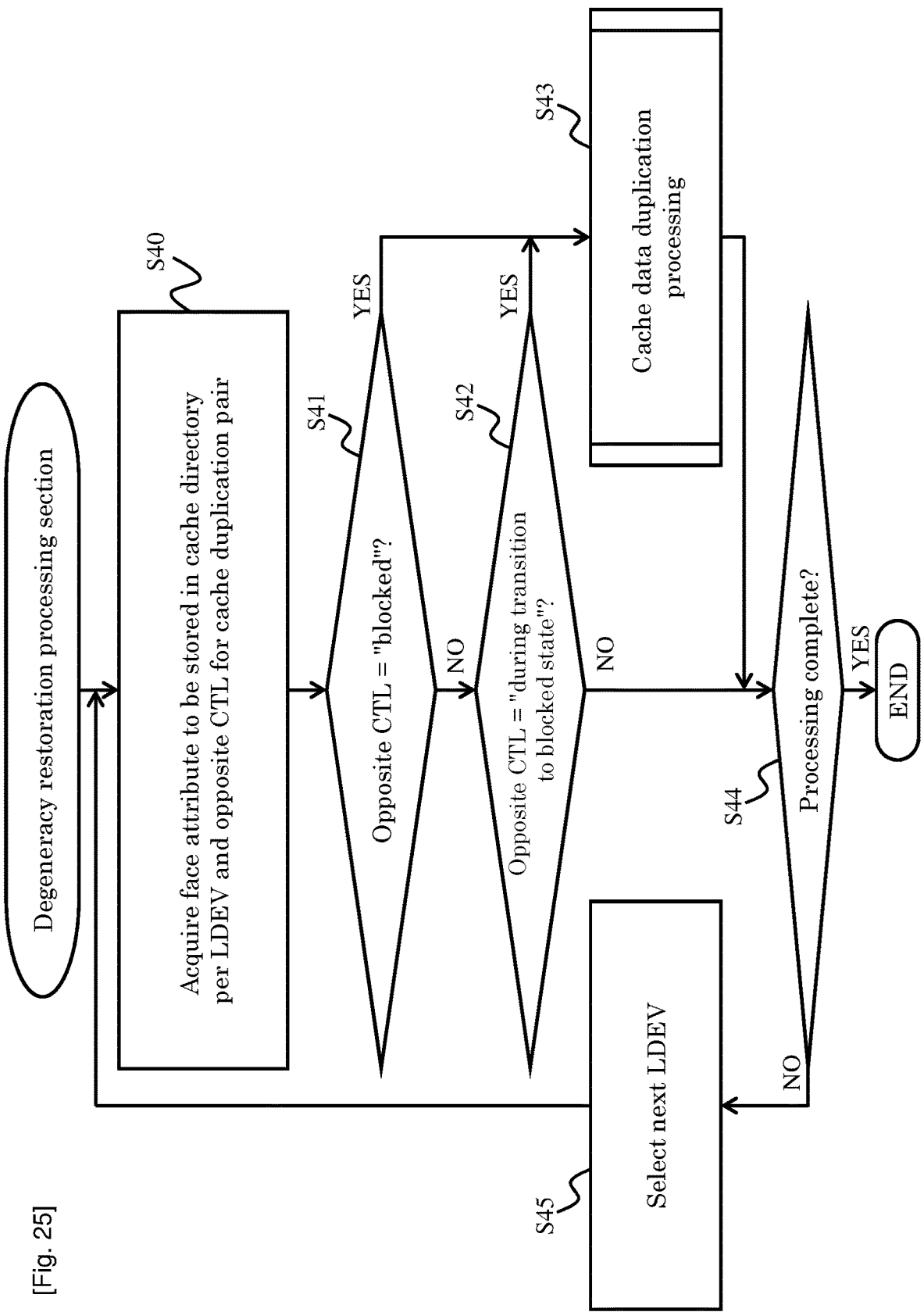
[Fig. 25]

[Fig. 26]
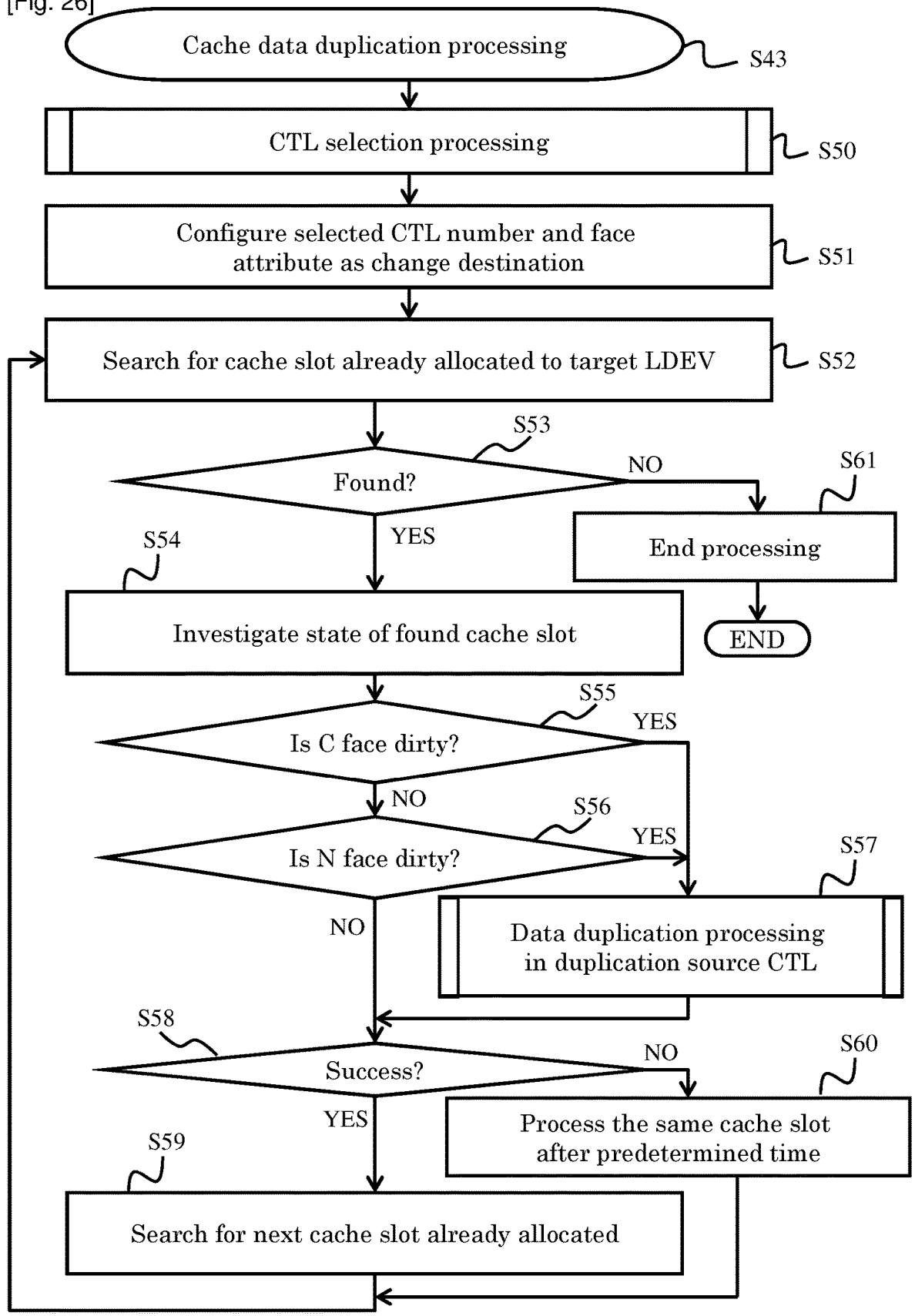

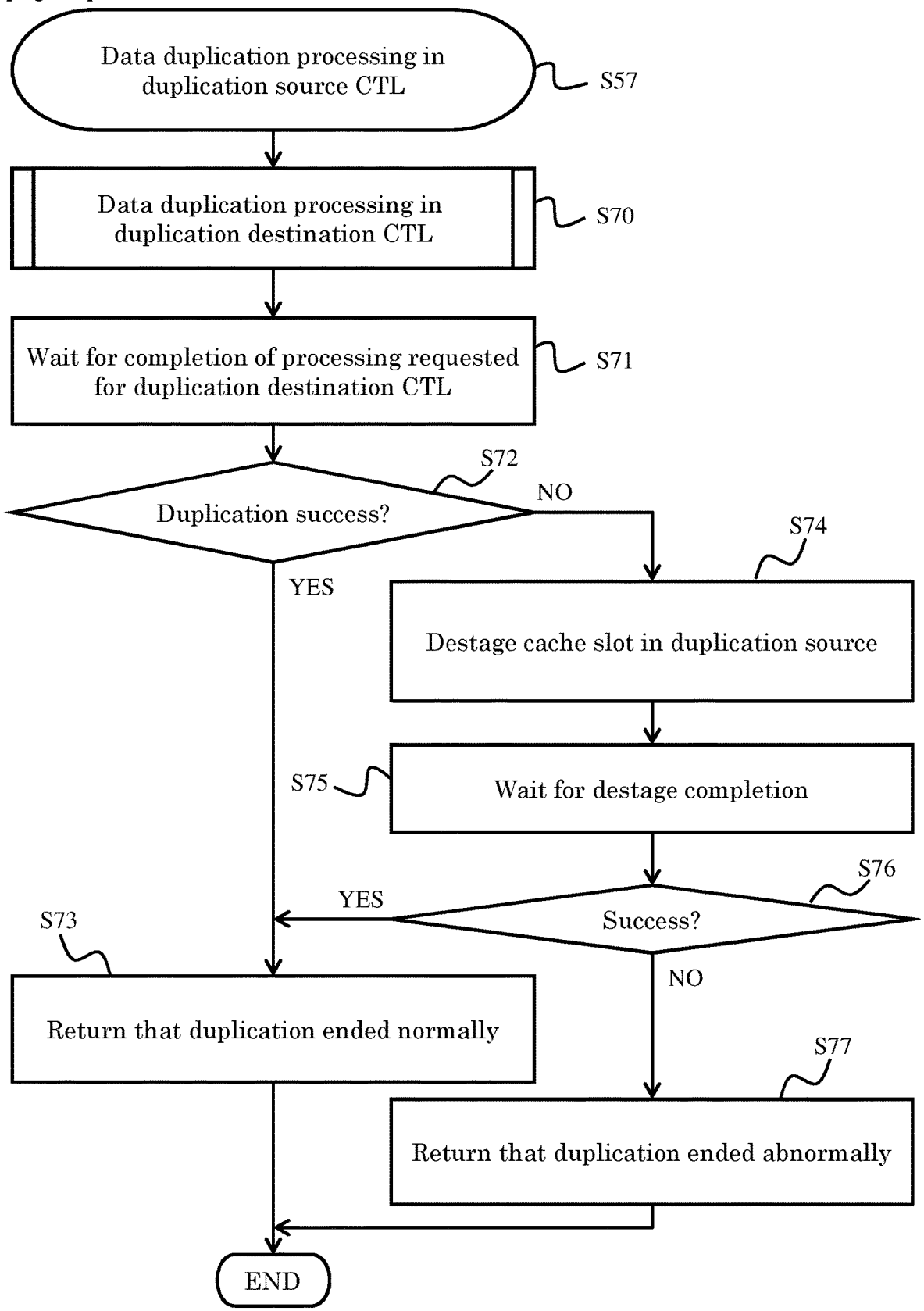

[Fig. 28]
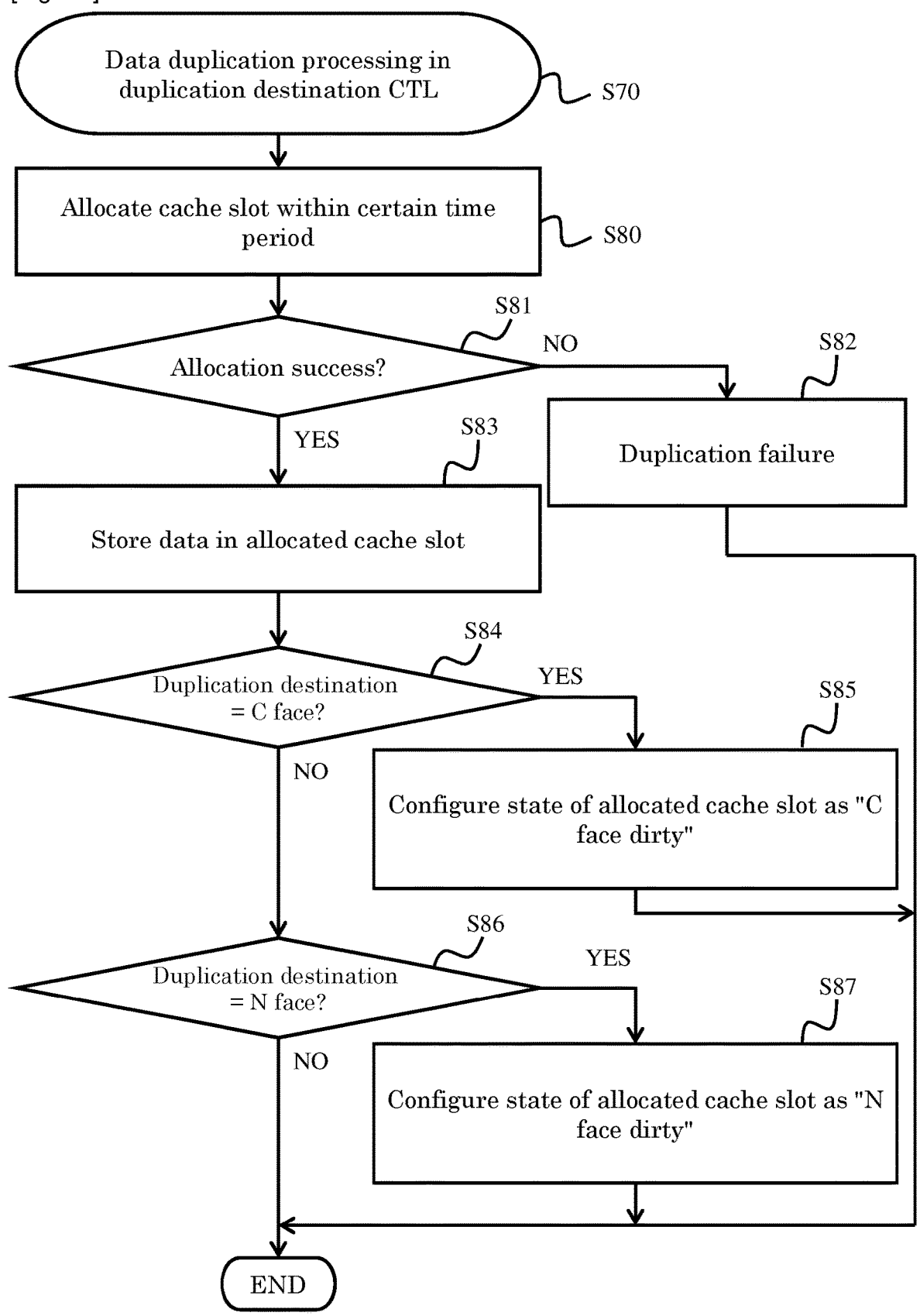

[Fig. 29]
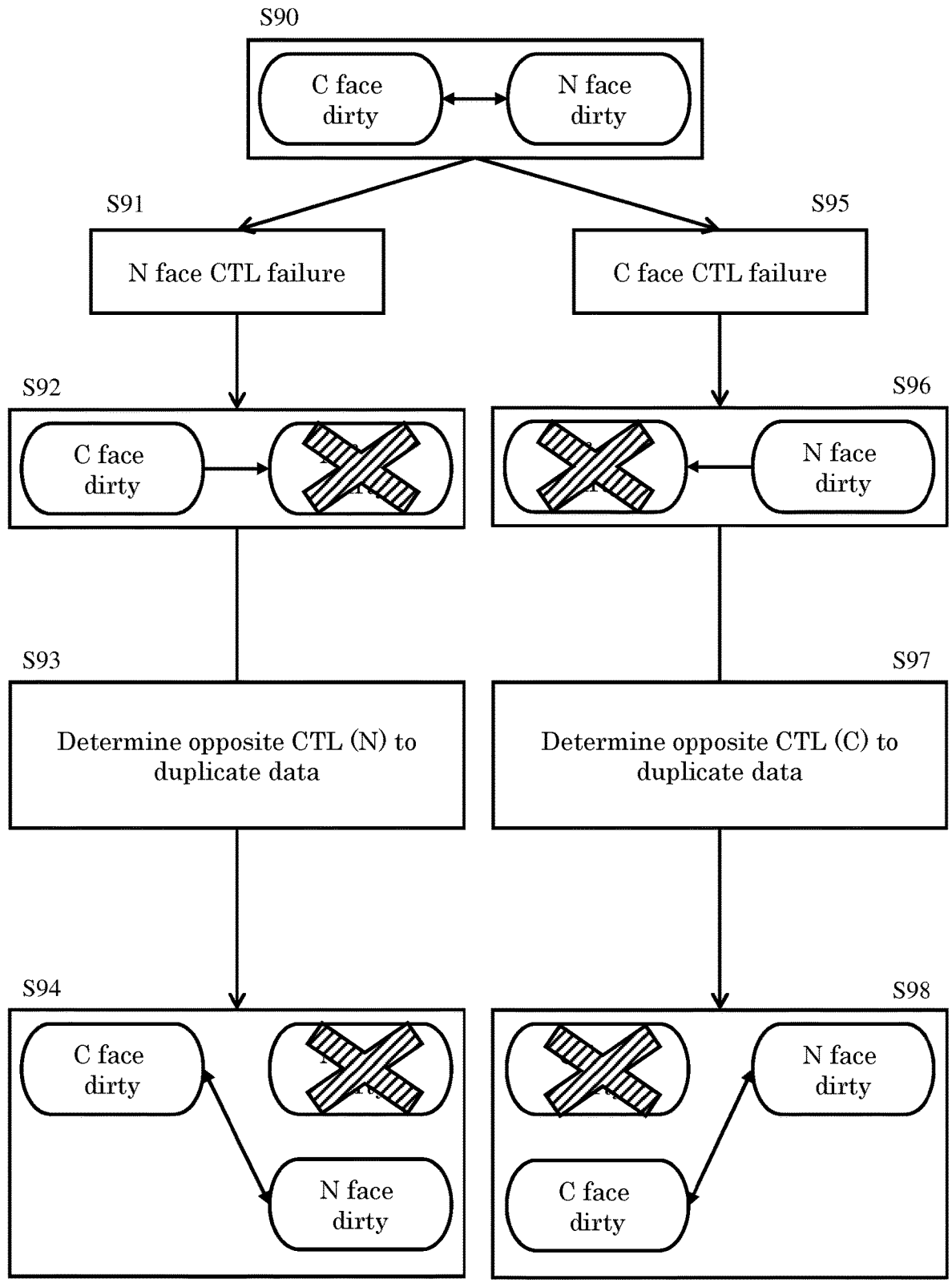

[Fig. 30]
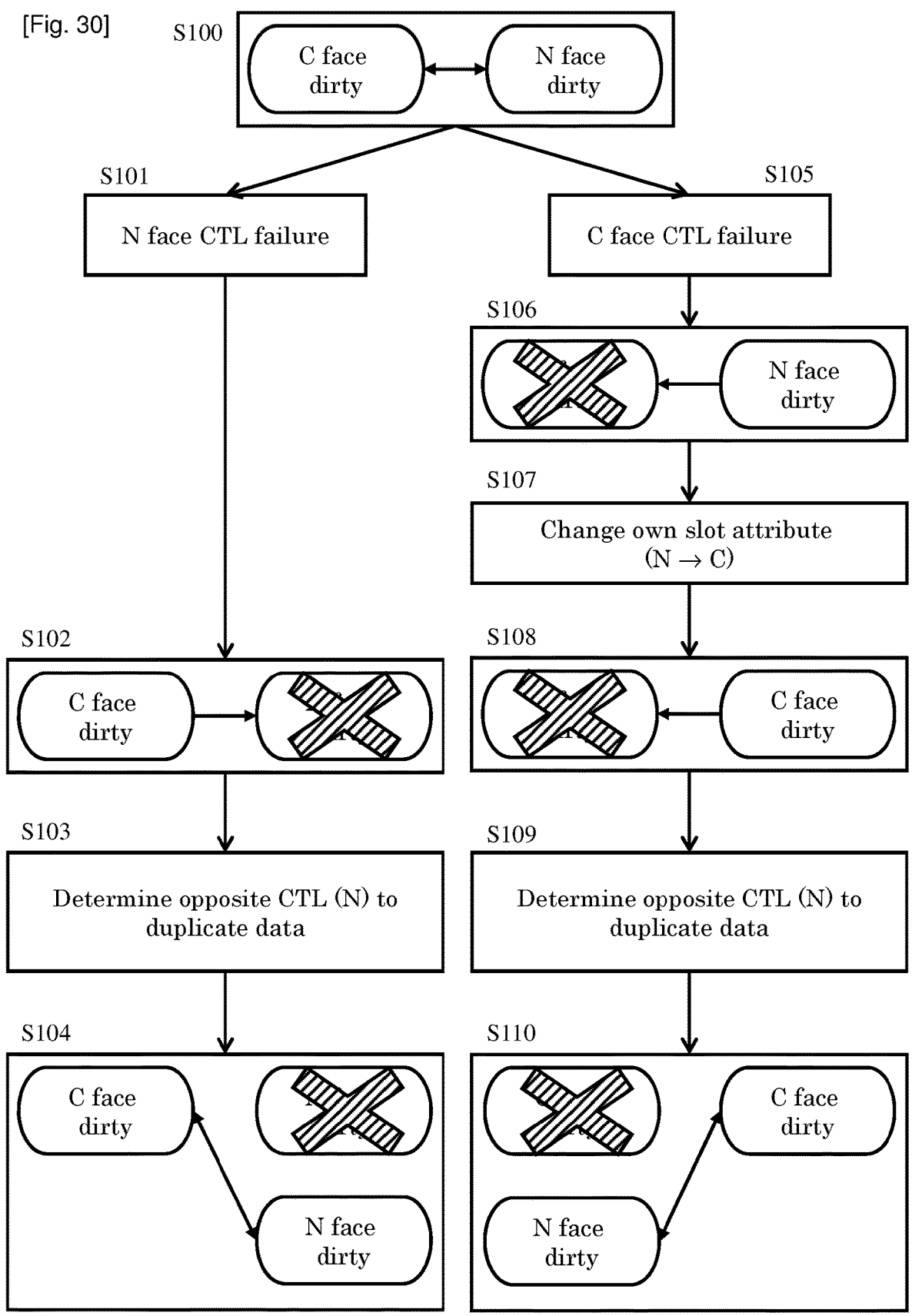

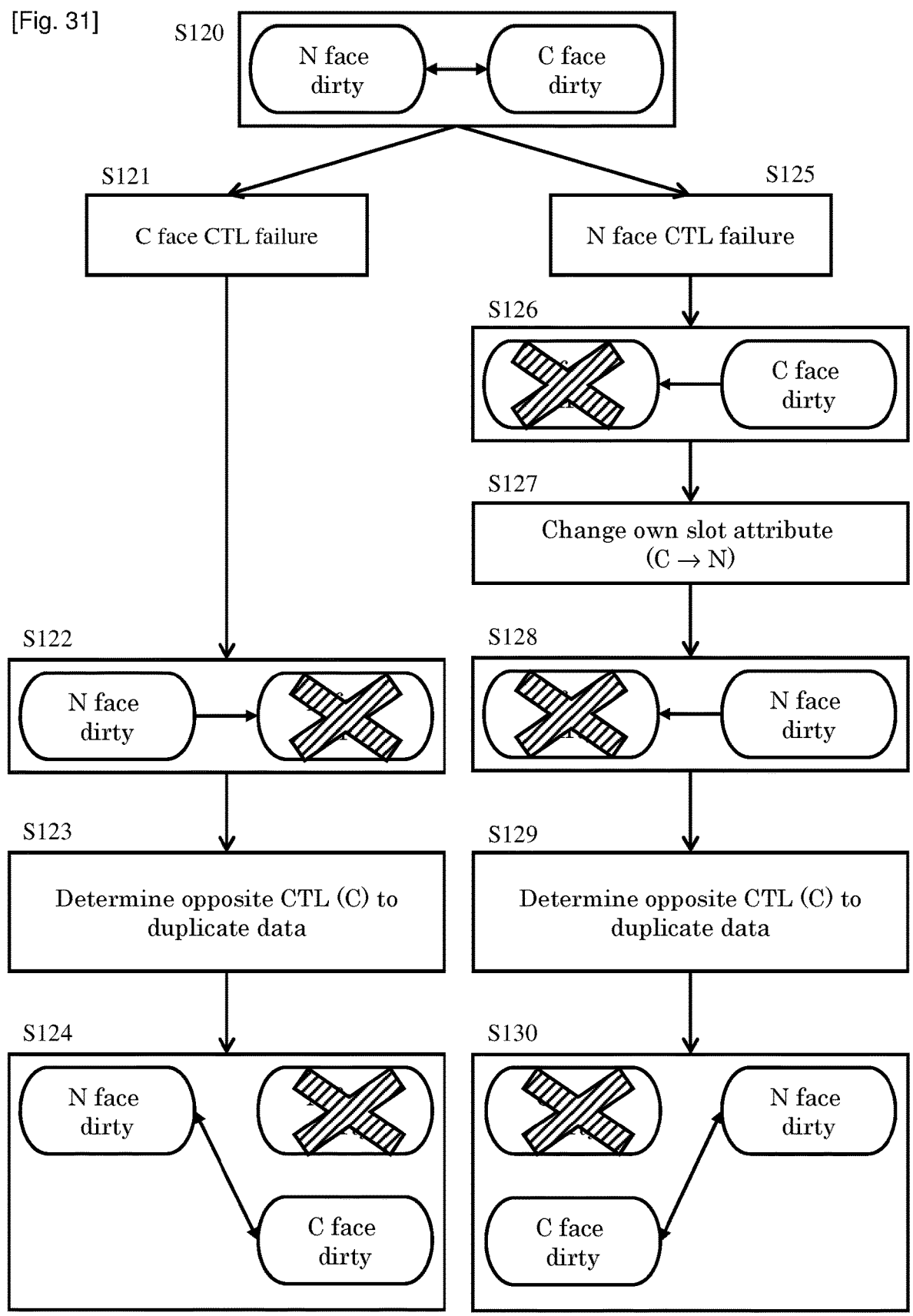
[Fig. 31]

[Fig. 32]
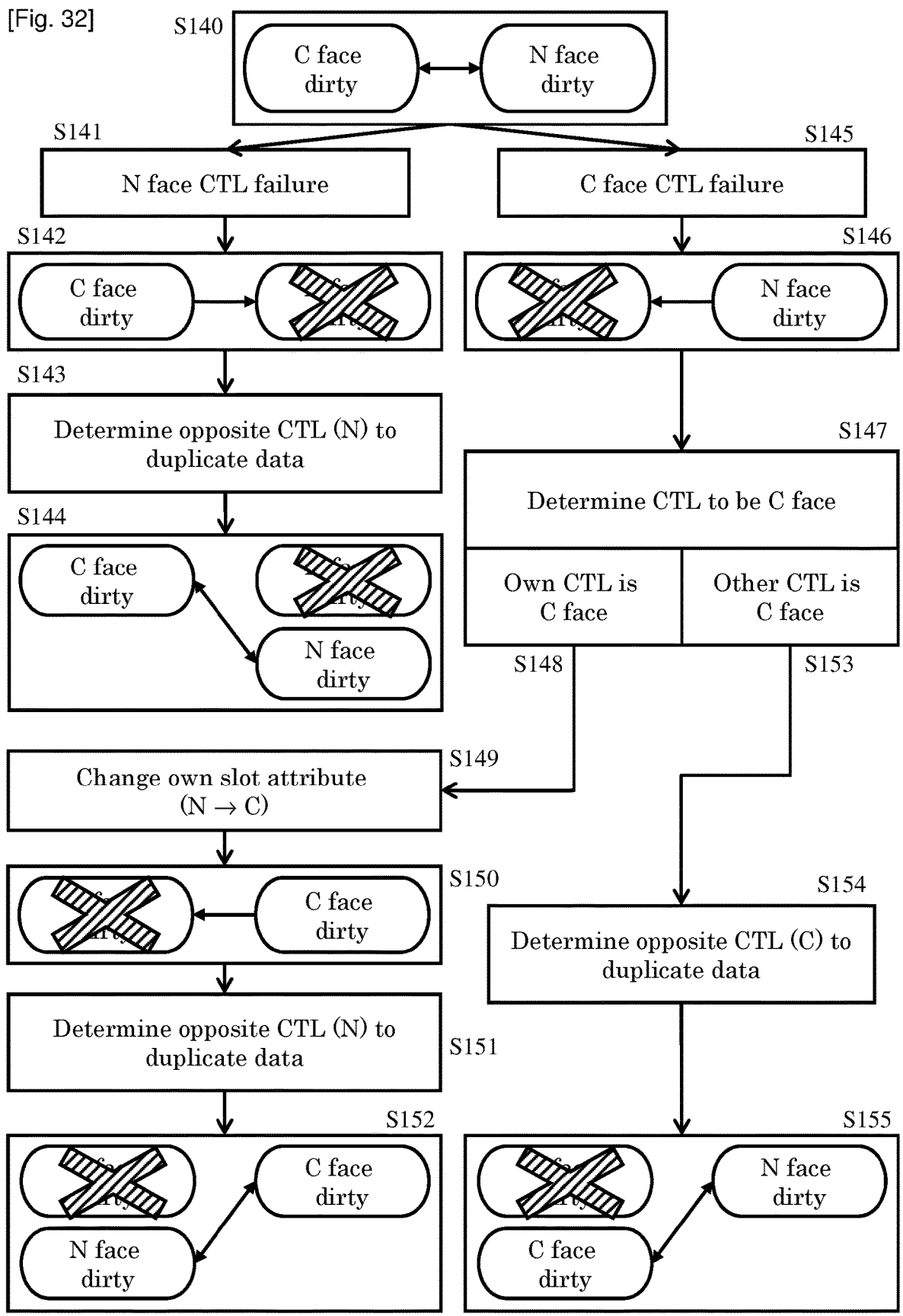

[Fig. 33]
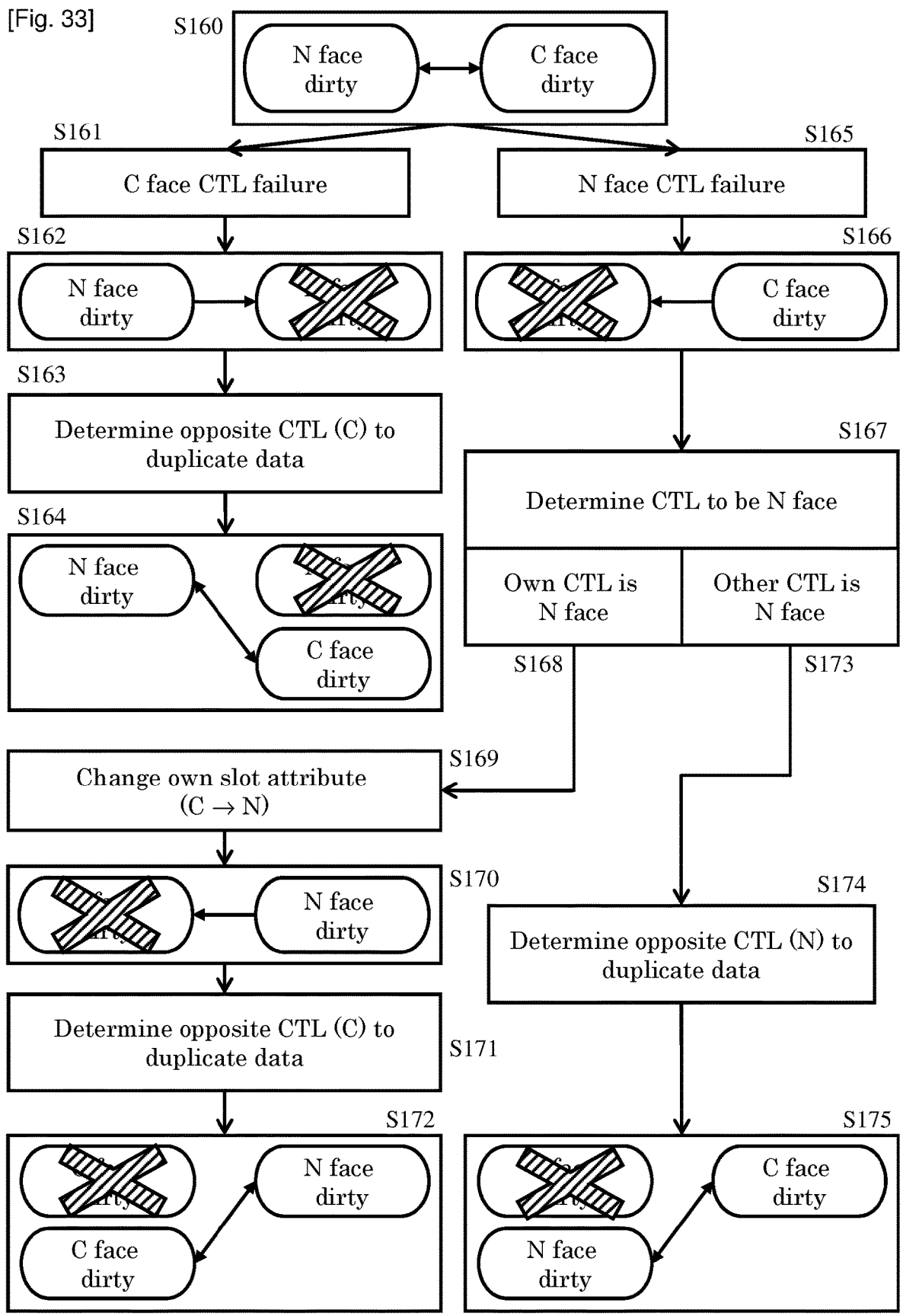

[Fig. 34]
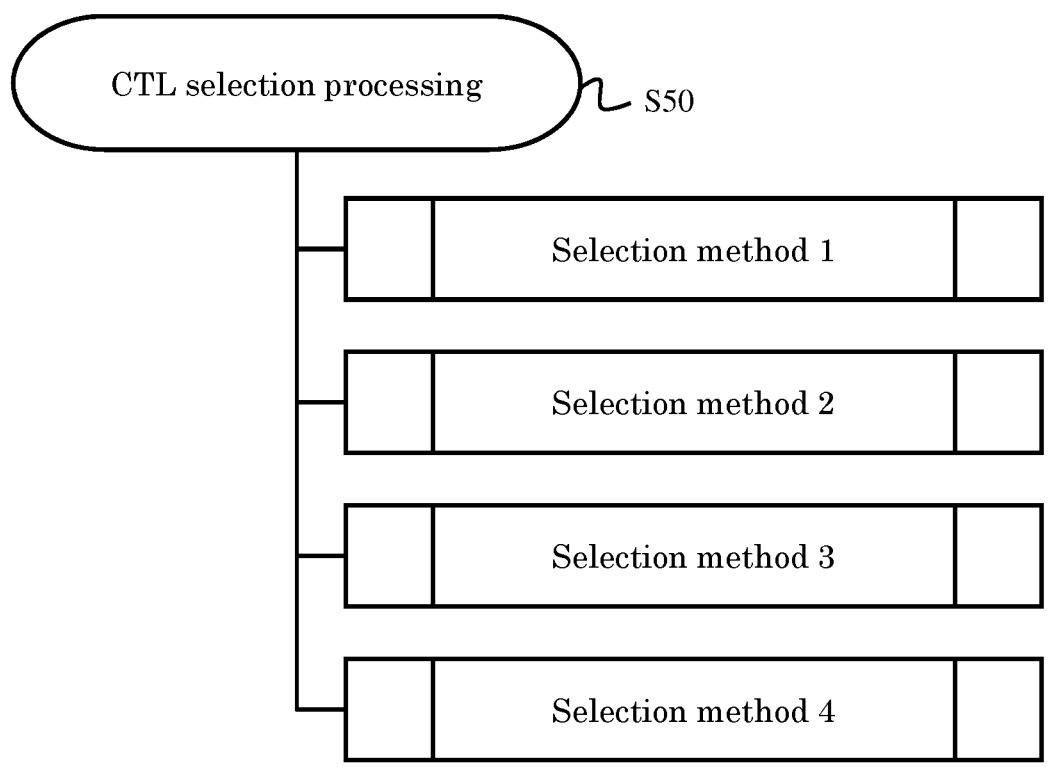

[Fig. 35]
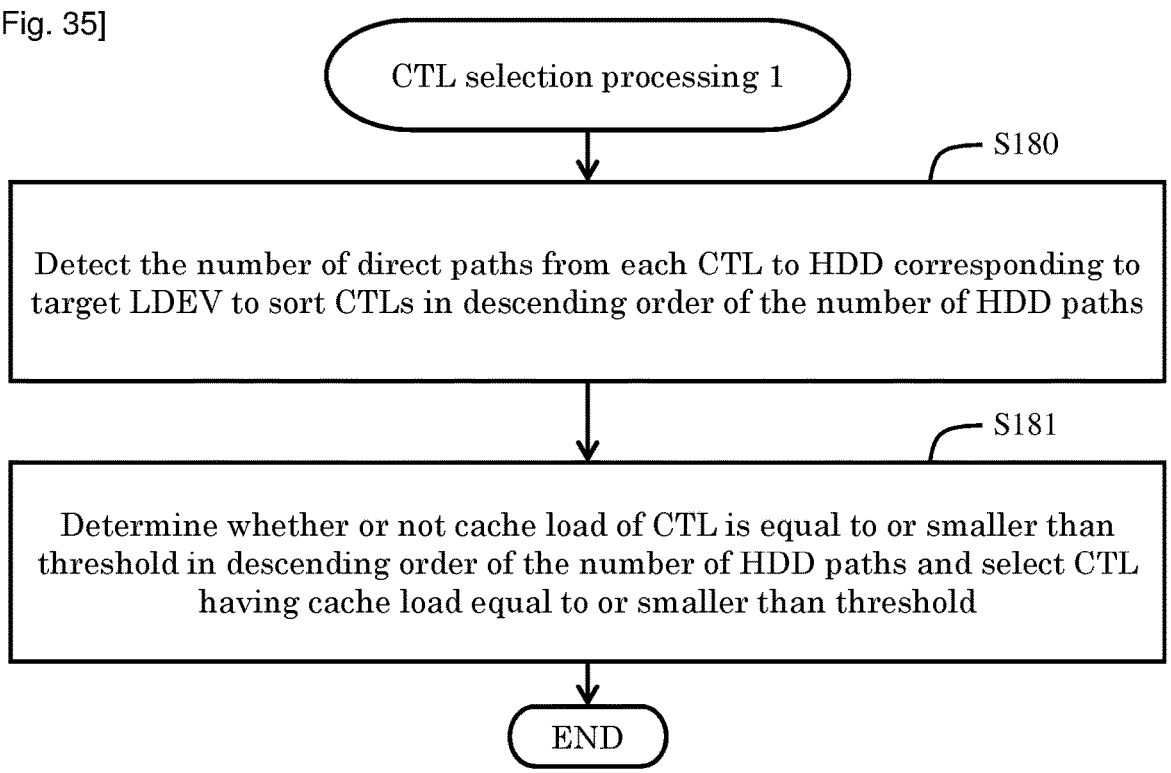

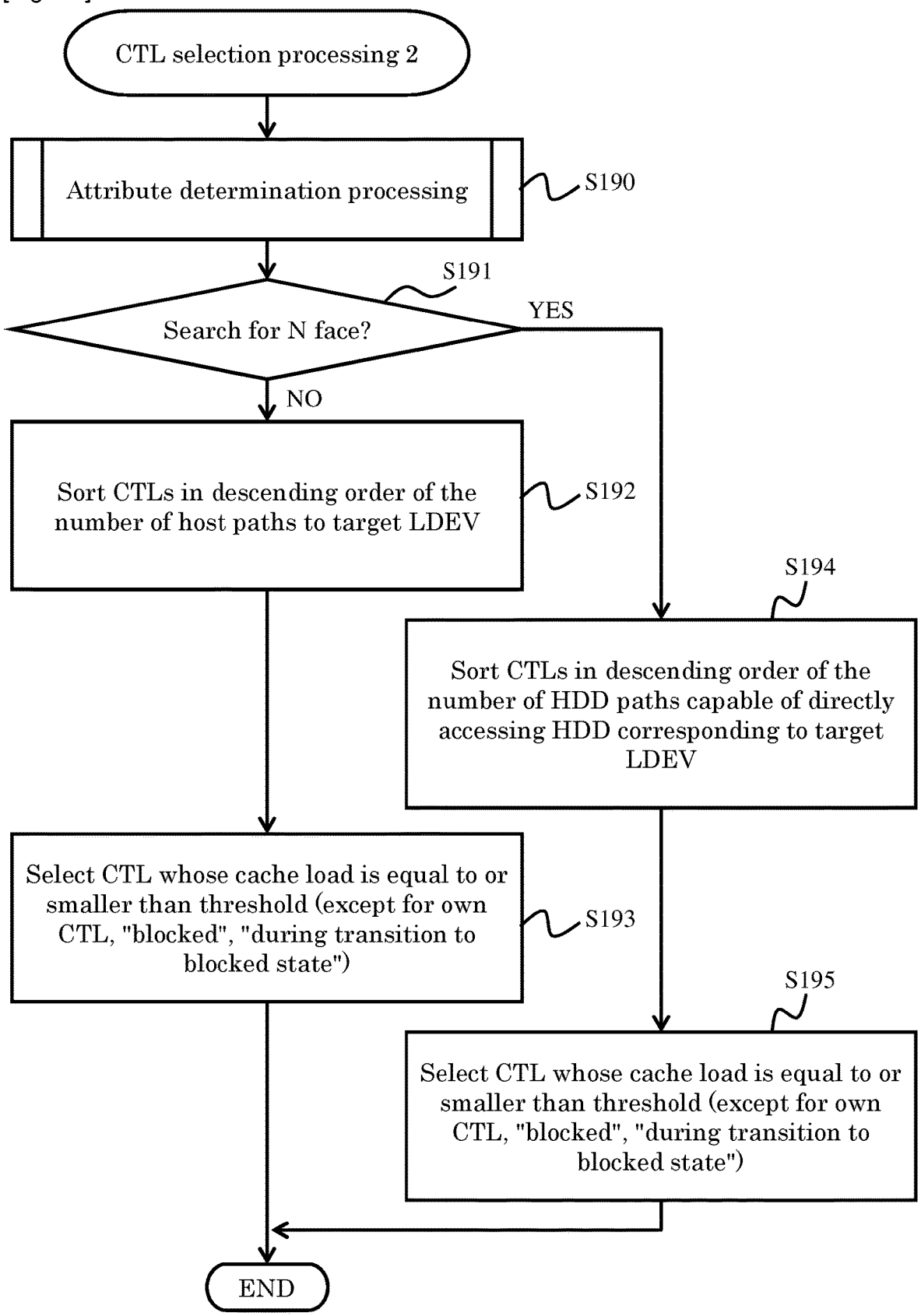
[Fig. 36]

[Fig. 37]
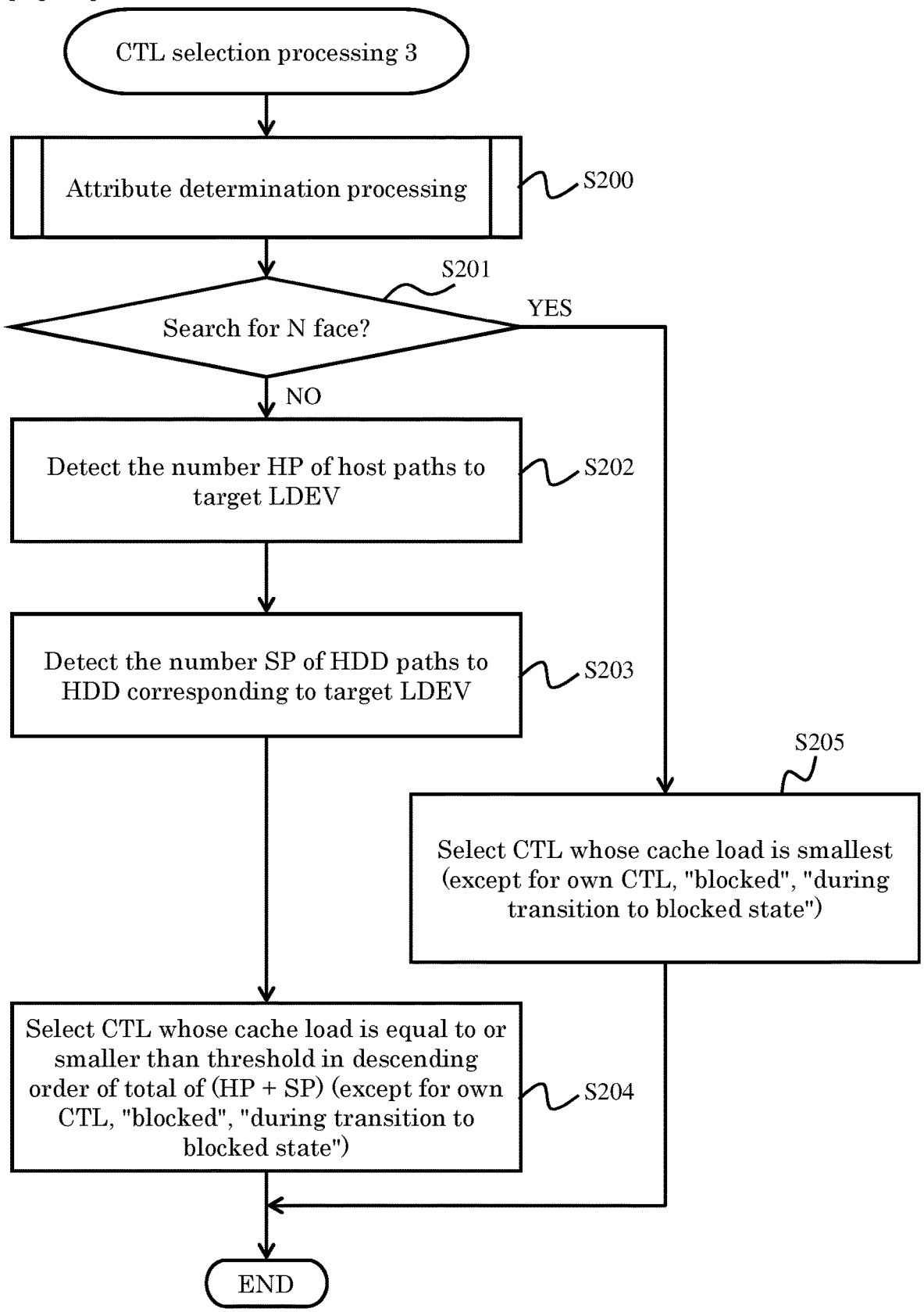

[Fig. 38]
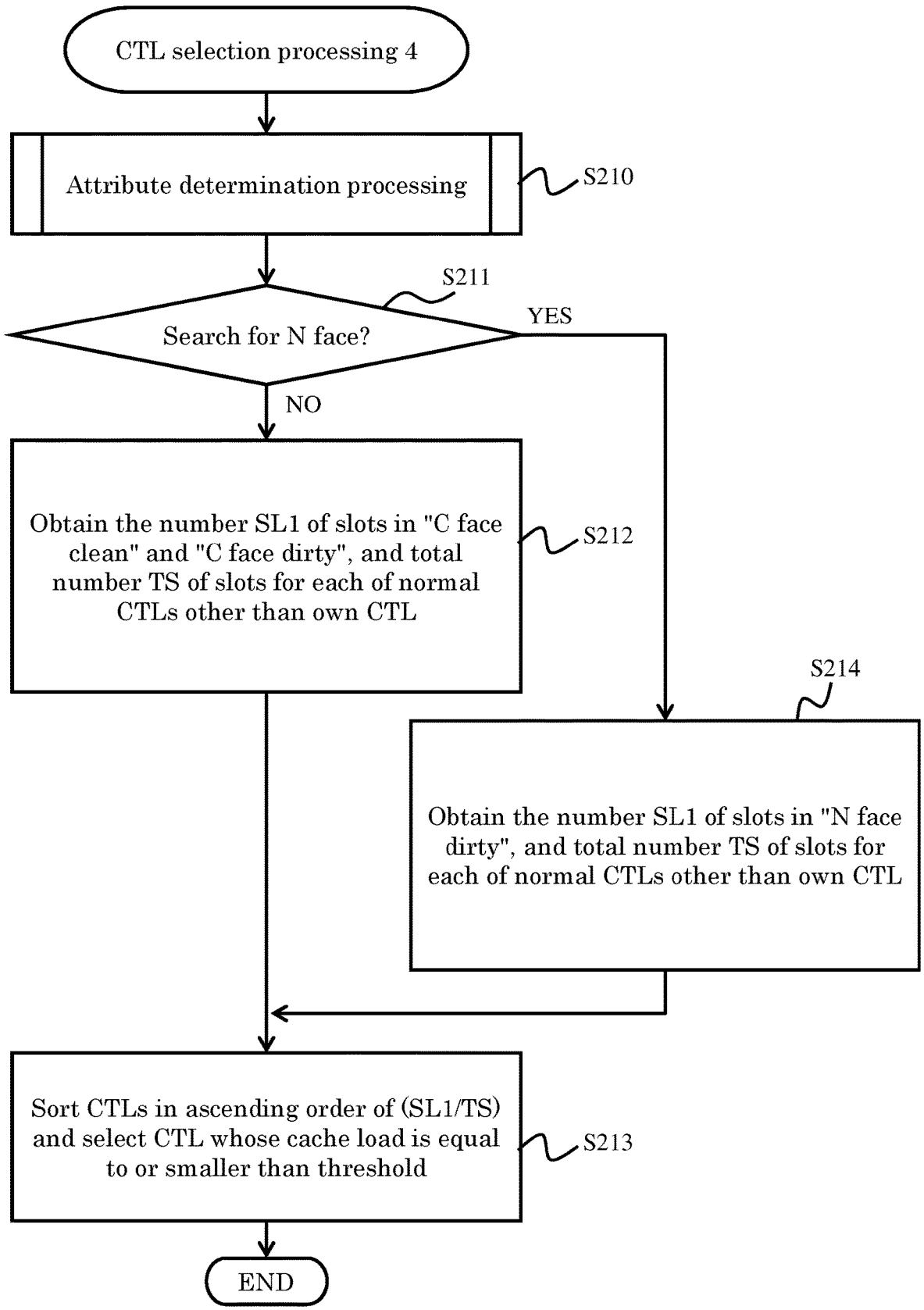

[Fig. 39]
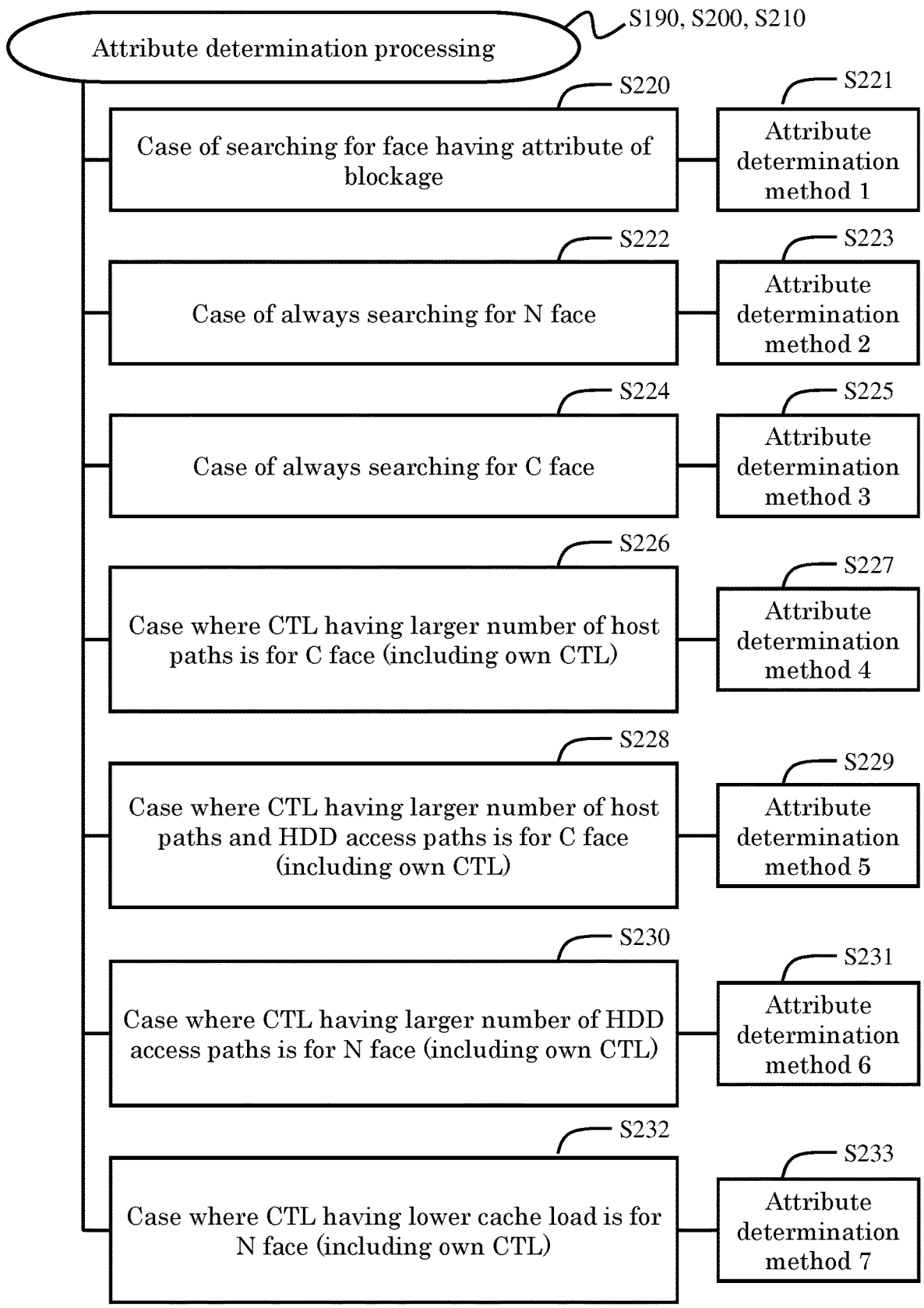

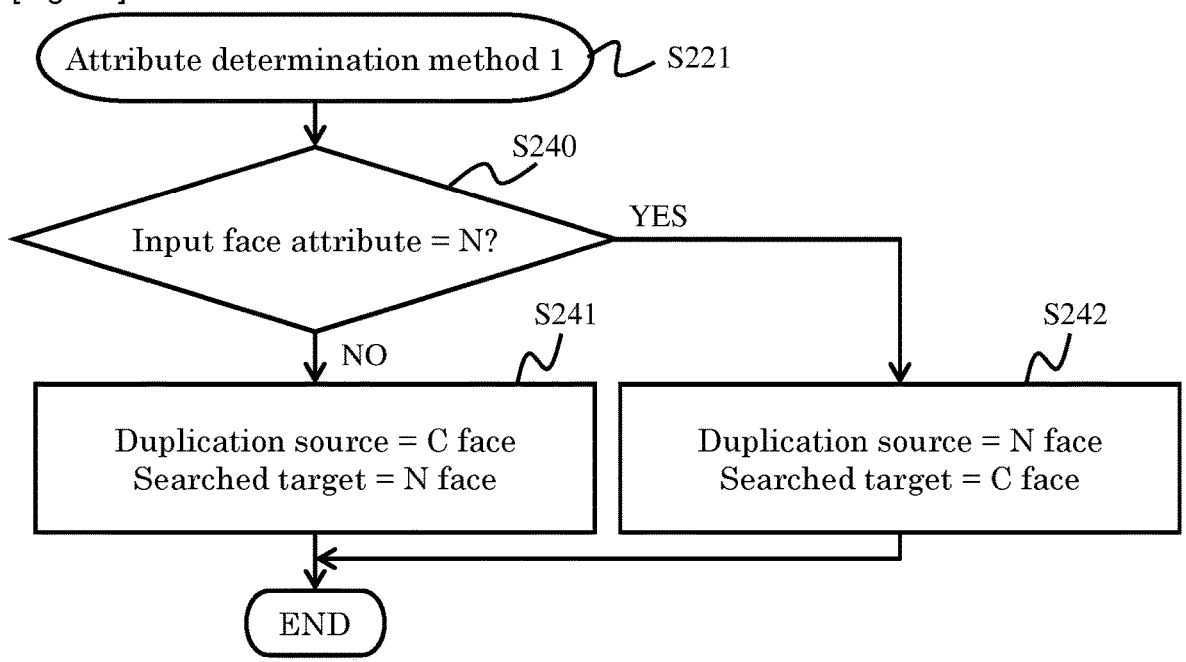
[Fig. 40]

[Fig. 41]
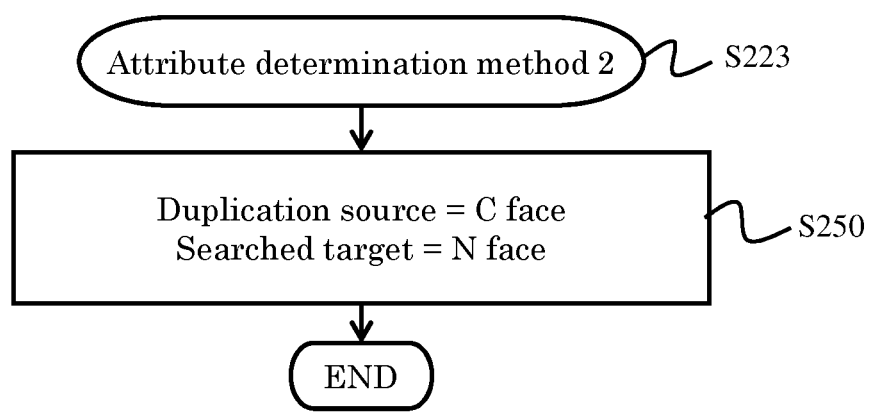

[Fig. 42]
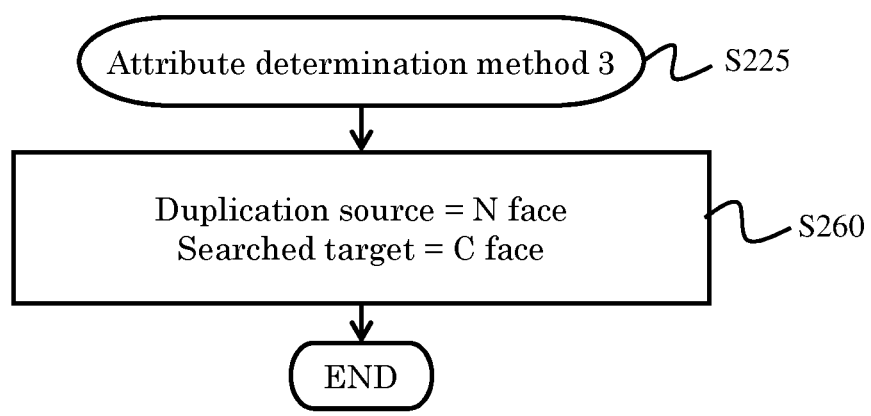

[Fig. 43]
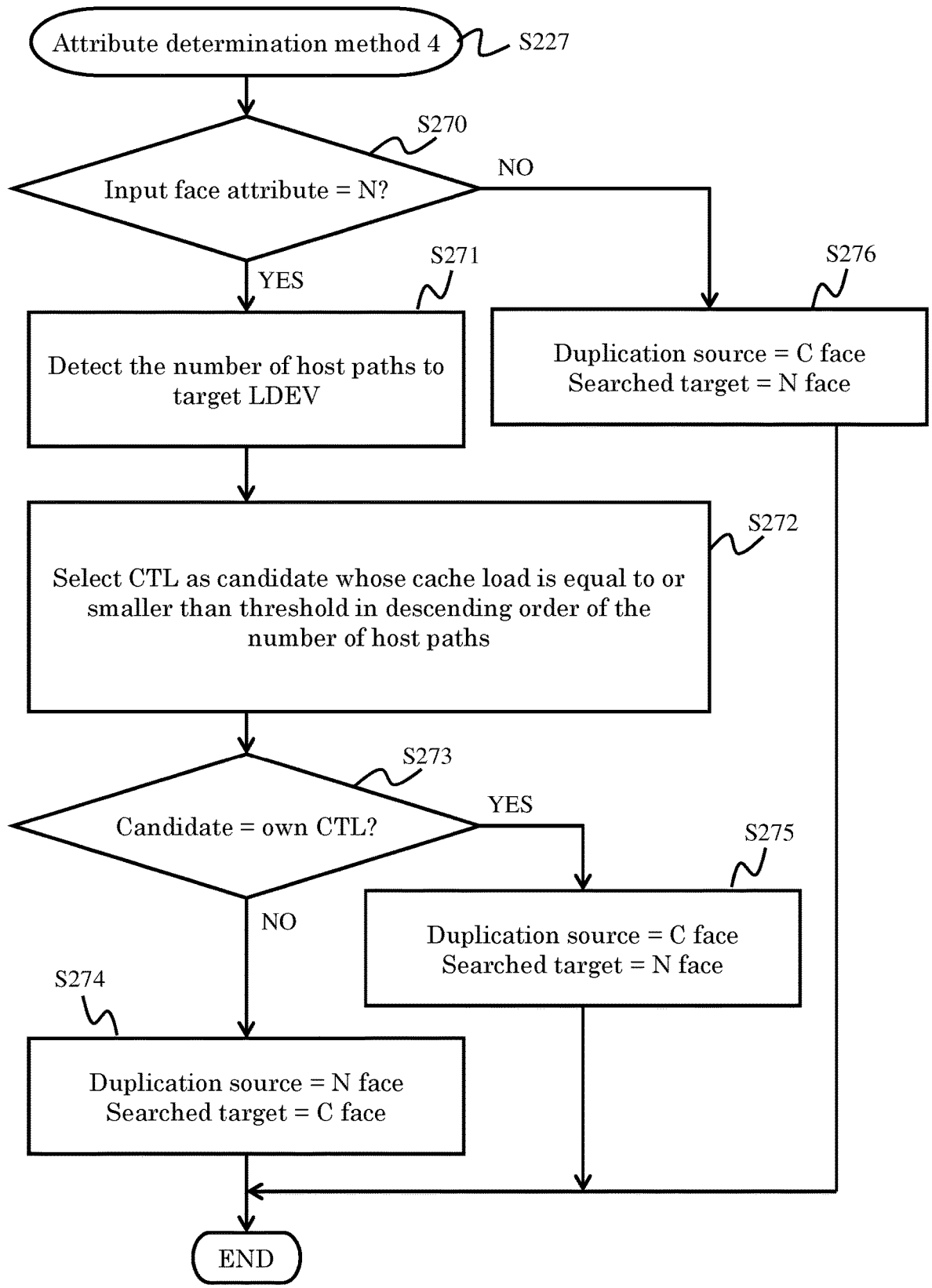

[Fig. 44]
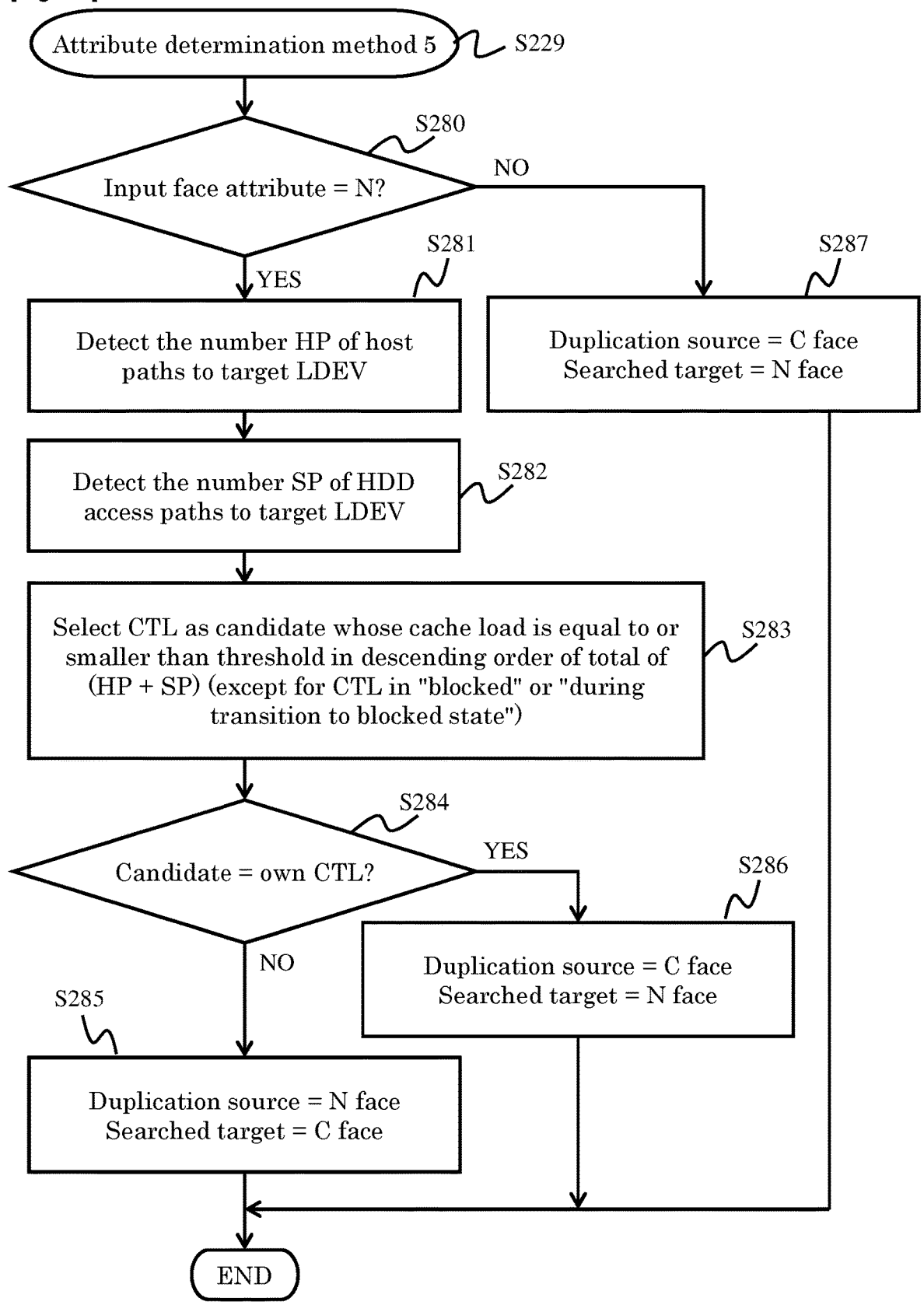

[Fig. 45]
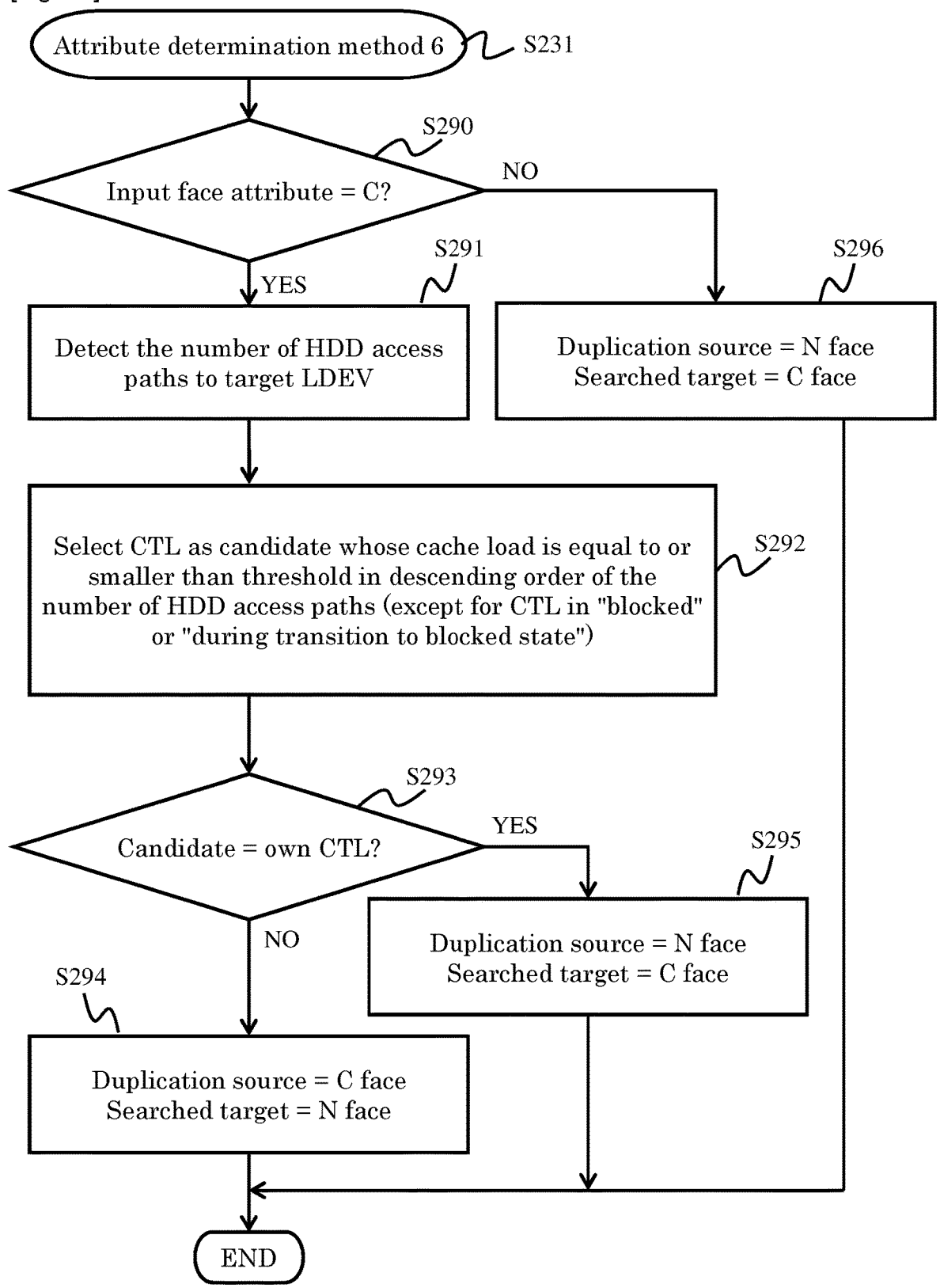

[Fig. 46]
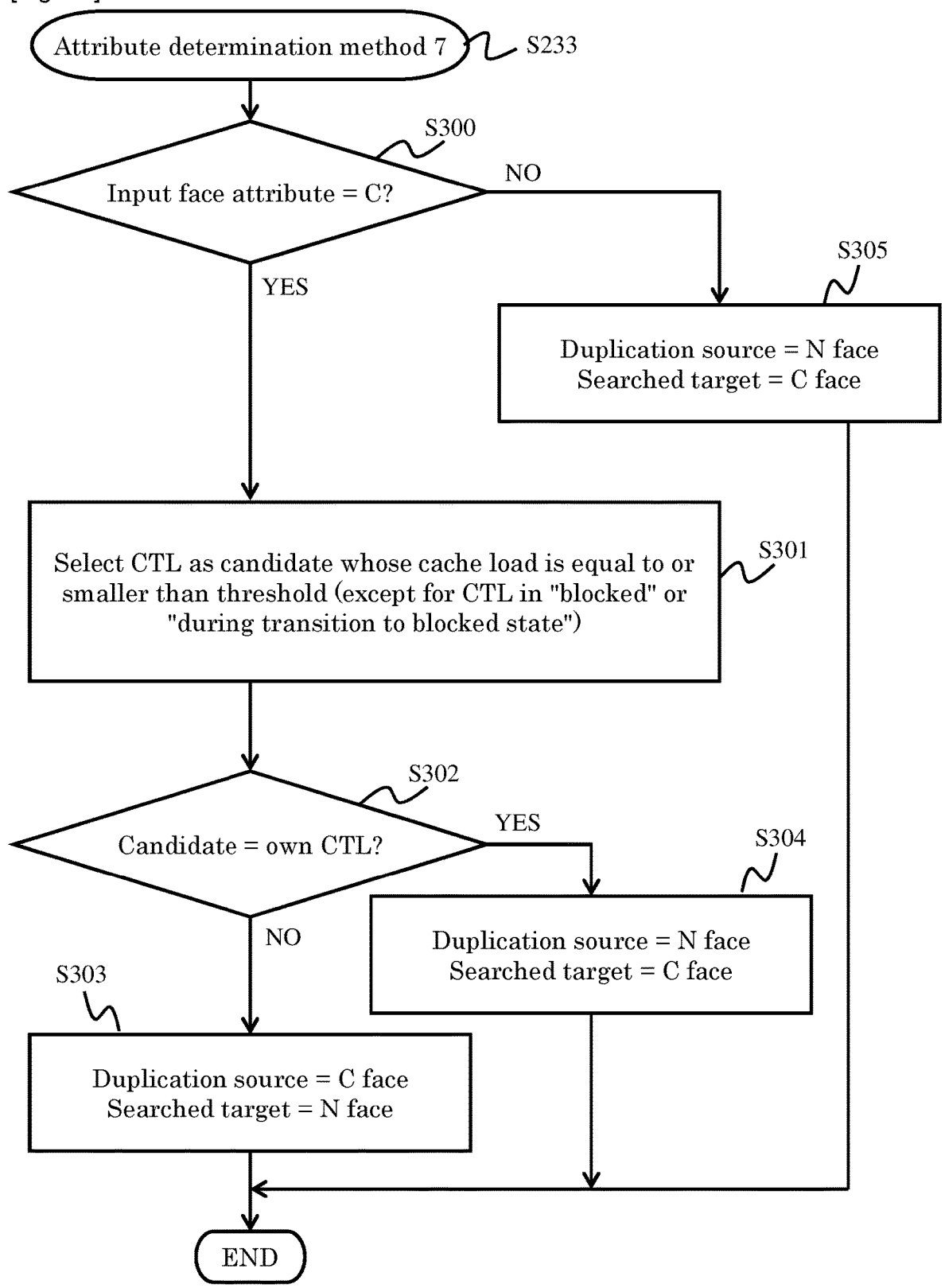

STORAGE DEVICE, CONTROLLING METHOD OF STORAGE DEVICE, AND STORAGE DEVICE CONTROLLER HAVING PREDETERMINED MANAGEMENT INFORMATION INCLUDING FACE ATTRIBUTE INFORMATION, A CONTROLLER NUMBER, AND TRANSITION METHOD INFORMATION

TECHNICAL FIELD

The present invention relates to a storage device, a controlling method of a storage device, and a storage device controller.

BACKGROUND ART

A storage device is configured to store write data in a cache memory, and thereafter, write the write data into a storing unit having a RAID (Redundant Arrays of Inexpensive Disks) configuration corresponding to a logical volume of a write destination. Data stored only in the cache memory and not written into the storing unit is called dirty data. The dirty data, which is stored only in the cache memory, may be lost if a failure ever occurs in the cache memory. For this reason, in the storage device, the dirty data is held in multiple cache memories to improve reliability (PTLs 1 and 2).

CITATION LIST

Patent Literature

[PTL 1]
  Japanese Patent Laid-Open No. 2005-43930
[PTL 2]
  Japanese Patent Laid-Open No. 2005-122453

SUMMARY OF INVENTION

Technical Problem

In the related art, multiple disk controllers each having a built-in cache memory hold the data, and when a failure occurs in one disk controller, another disk controller transfers the data to a different disk controller to duplicate the data.

However, in the related art, since a storage device management unit which is provided separately from a disk controller group determines a disk controller for duplicating and holding the cache data, if a failure occurs in the storage device management unit, the disk controller for duplicating and holding the cache data cannot be changed.

Furthermore, in the related art, a degree of freedom is lower for a method for selecting the cache memory for duplicating and holding the cache data, in which there is also room for improvement.

The present invention is made in consideration of the above problem and has an object to provide a storage device, a controlling method of a storage device, and a storage device controller in which the controllers each including a cache memory can manage duplication of cache data and the cache memory can be more flexibly selected as compared with the related art.

Solution to Problem

In order to solve the above problem, a storage device according to the present invention is a storage device duplicating and managing cache data including multiple controllers each configured to include a cache memory, and multiple storing units used by the controllers and configured with at least one logical volume for being provided to a higher-level device, wherein each of the controllers is configured to hold predetermined management information configured for each logical volume, the predetermined management information includes face attribute information indicating that the cache memory is used as any of a first face or a second face forming a duplication pair for duplicating and storing the cache data, a controller number identifying a paired destination controller including a cache memory which forms the duplication pair with the cache memory, and transition method information indicating a state transition method of the cache memory, and each of the controllers is configured to invoke a predetermined duplication recovery function in a case where the paired destination controller forming the duplication pair is blocked, to select a new paired destination controller for each logical volume on the basis of the predetermined management information, forward the cache data stored in the cache memory included in the own controller to the new paired destination controller, and store the cache data in a cache memory included in the new paired destination controller to duplicate and manage the cache data.

Advantageous Effects of Invention

According to the present invention, in the case where the controller forming the duplication pair of the cache data is blocked, each of the controllers can invoke a predetermined duplication recovery function to select the new paired destination controller from other controllers, forward the cache data, and store the cache data in the cache memory included in the new paired destination controller. By doing so, according to the invention, the availability against a failure can be improved and the controller formed in the duplication pair can be flexibly selected, enhancing the usability.

BRIEF DESCRIPTION OF DRAWINGS

FIG. 1 is an explanation diagram illustrating a general outline of an embodiment.
FIG. 2 is a hardware configuration diagram of a storage device.
FIG. 3 is an explanation diagram illustrating storing content in a memory.
FIG. 4 is an explanation diagram illustrating storing content in a cache directory.
FIG. 5 is an explanation diagram illustrating in detail a part of the storing content illustrated in FIG. 4.
FIG. 6 is an explanation diagram illustrating content of storage configuration information.
FIG. 7 is a diagram of LDEV (Logical Device) information illustrated in FIG. 6.
FIG. 8 is a diagram of VDEV (Virtual Device) information illustrated in FIG. 6.
FIG. 9 is a diagram of HDD (Hard Disk Drive) information illustrated in FIG. 6.
FIG. 10 is a diagram of HDD access path information illustrated in FIG. 9.
FIG. 11 is a diagram of an LDEV/VDEV conversion table illustrated in FIG. 6.
FIG. 12 is a diagram of LDEV list terminal information for each VDEV illustrated in FIG. 11.
FIG. 13 is a diagram of list main body information for each LDEV illustrated in FIG. 11.

FIG. 14 is a diagram of a VDEV/HDD conversion table illustrated in FIG. 6.

FIG. 15 is a diagram of HDD list terminal information for each VDEV illustrated in FIG. 14.

FIG. 16 is a diagram of list main body information for each HDD illustrated in FIG. 14.

FIG. 17 is a diagram of controller information illustrated in FIG. 6.

FIG. 18 is a diagram of host path information illustrated in FIG. 6.

FIG. 19 is a diagram of information on the number of host paths illustrated in FIG. 6.

FIG. 20 is a diagram of information on the number of access paths illustrated in FIG. 6.

FIG. 21 is a diagram of information specifying a cache slot transition scheme illustrated in FIG. 6.

FIG. 22 is a state transition diagram of a cache slot.

FIG. 23 is a flowchart illustrating processing by a controller which detects that a certain controller is blocked due to a failure.

FIG. 24 is a flowchart illustrating processing by a controller blocked due to a maintenance work.

FIG. 25 is a main flowchart of processing for duplicating and holding the cache data.

FIG. 26 is a flowchart illustrating, in detail, data duplication processing in FIG. 25.

FIG. 27 is a flowchart illustrating, in detail, data duplication processing in a data duplication source controller illustrated in FIG. 26.

FIG. 28 is a flowchart illustrating, in detail, data duplication processing in a data duplication destination controller illustrated in FIG. 27.

FIG. 29 is an explanation diagram illustrating a situation where a controller is searched for whose intended use is the same as that having an attribute of a blocked cache memory.

FIG. 30 is an explanation diagram illustrating a situation where an N face controller is always searched for.

FIG. 31 is an explanation diagram illustrating a situation where a C face controller is always searched for.

FIG. 32 is an explanation diagram illustrating a situation where a controller to be used as a C face is previously determined and an attribute of that controller is changed from an N face to a C face as needed.

FIG. 33 is an explanation diagram illustrating a situation where a controller to be used as an N face is previously determined and an attribute of that controller is changed from a C face to an N face as needed.

FIG. 34 is a flowchart of processing for selecting a controller that is a new paired destination.

FIG. 35 is a flowchart illustrating, in detail, controller selection processing 1 illustrated in FIG. 34.

FIG. 36 is a flowchart illustrating, in detail, controller selection processing 2 illustrated in FIG. 34.

FIG. 37 is a flowchart illustrating, in detail, controller selection processing 3 illustrated in FIG. 34.

FIG. 38 is a flowchart illustrating, in detail, controller selection processing 4 illustrated in FIG. 34.

FIG. 39 is a flowchart illustrating processing for determining the attribute of the cache memory.

FIG. 40 is a flowchart illustrating, in detail, a determination method 1 illustrated in FIG. 39.

FIG. 41 is a flowchart illustrating, in detail, a determination method 2 illustrated in FIG. 39.

FIG. 42 is a flowchart illustrating, in detail, a determination method 3 illustrated in FIG. 39.

FIG. 43 is a flowchart illustrating, in detail, a determination method 4 illustrated in FIG. 39.

FIG. 44 is a flowchart illustrating, in detail, a determination method 5 illustrated in FIG. 39.

FIG. 45 is a flowchart illustrating, in detail, a determination method 6 illustrated in FIG. 39.

FIG. 46 is a flowchart illustrating, in detail, a determination method 7 illustrated in FIG. 39.

DESCRIPTION OF EMBODIMENTS

Hereinafter, a description is given of embodiments of the present invention on the basis of the drawings. FIG. 1 is an explanation diagram illustrating an outline of an embodiment. FIG. 1 illustrates the outline of the embodiment to an extent required to understand and implement the present invention, and the scope of the present invention is not limited to an illustrated configuration. In the following description, the cache data may be abbreviated as the data in some cases.

A storage device SD according to the embodiment includes multiple controllers 1 and at least one storing unit 21, for example. Each controller 1 has a memory 14. A detailed configuration example of the controller 1 is described later referring to FIG. 2. The memory 14 has a cache memory area (hereinafter, referred to as a cache memory) 130 formed therein, as described later referring to FIG. 3.

A drive box 2 accommodates multiple storing units 21. Physical storing areas which multiple storing units 1 have are virtualized as a RAID group. A storing area united as the RAID group is called a VDEV 23 herein. An arbitrary size of storing area can be extracted from the VDEV 23 to obtain a logical storing unit. This logical storing unit is called a LDEV 24 or a logical volume 24 herein.

The controller 1 provides the LDEV 24 to a host computer 3 as a higher-level device (see FIG. 2). The host computer 3 reads and writes the data from and into the LDEV 24. In the figure, the controller is abbreviated as a "CTL".

When the controller 1 is requested from the host computer 3 to write the data, the controller 1 stores the data (write data) received from the host computer 3 in a cache slot of the cache memory 130. Then, at a time of completion of storing the data in the cache memory 130, the controller 1 notifies the host computer 3 of processing completion of a write command. After that, the controller 1 writes the write data stored in the cache memory 130 into the storing unit 21 corresponding to a storing area in the LDEV 24 as a write destination at a predetermined timing. The processing of writing the date in the cache memory 130 into the storing unit 21 is called destage processing.

When the controller 1 is requested from the host computer 3 to read the data, the controller 1 checks whether or not the requested data (read data) is stored in the cache memory 130. If the read data exists in the cache memory 130, the controller 1 sends that read data to the host computer 3 to notify the host computer 3 of processing completion of a read command. In contrast to this, if the read data does not exist in the cache memory 130, the controller 1 reads, from the storing unit 21 corresponding to the LDEV 24 in which that read data is written, the relevant data and sends the data to the host computer 3 to notify the host computer 3 of the processing completion of the read command. The controller 1 also performs conversion processing between a logical address used by the host computer 3 and a physical address used by the storing unit 21, RAID parity calculation, and the like.

In the embodiment, the controller 1 to duplicate and manage the cache data is determined for each LDEV 24. In the example in FIG. 1, the data stored in a cache slot ST11 (C) in the controller 1 (CTL #1) is paired with the data stored in a cache slot ST21 (N) in the controller 1 (CTL #2). Both the cache slot ST11 (C) and the cache slot ST21 (N) correspond to the LDEV 24 (#1).

Similarly, the data stored in a cache slot ST12 (N) in the controller 1 (CTL #1) is paired with the data stored in a cache slot ST22 (C) in the controller 1 (CTL #2). Both the cache slot ST12 (N) and the cache slot ST22 (C) correspond to the LDEV 24 (#2).

Similarly, the data stored in a cache slot ST23 (C) in the controller 1 (CTL #2) is paired with the data stored in a cache slot ST33 (N) in the controller 1 (CTL #3) also. Both the cache slot ST23 (C) and the cache slot ST33 (N) correspond to another LDEV 24 not illustrated. Each of these pairs described above corresponds to a "duplication pair for duplicating and storing the cache data".

The cache memory 130 can includes an area (cache slot) used as a cache face (C) and an area (cache slot) used as a storage holding face (N) in a mixed manner. A sign (N) is an initial of NVS (Non-Volatile Storage). Hereinafter, those are called a C face and an N face, respectively. The C face corresponds to a "first face" and the N face corresponds to a "second face". How to use the C face and the N face differently from each other depends on a specification or a user's configuration. For example, the C face may be used to send and receive the data to and from the host computer 3 and the N face may be used to send and receive the data to and from the storing unit 21. The C face may be used to send and receive the data to and from both the host computer 3 and the storing unit 21 and the N face may be used for backup of the cache data.

The data in a state of being stored only in the cache memory 130 and not stored in the storing unit 21 is called dirty data. In the storage device 1, in order to prevent the dirty data from being lost, pairs are formed of different multiple controllers 1, and the cache memory 130 in each of the paired controllers 1 holds the dirty data. When the destage processing is performed and the data is written into the storing unit 21 corresponding to the write destination LDEV 24, the dirty data becomes clean data. The cache slot in which the clean data is stored can be used to be overwritten.

Here, the controller 1 may be blocked due to a device failure or a maintenance work in some cases. In the example in FIG. 1, a trouble occurs in the controller 1 (CTL #1) to block the controller 1 (CTL #1). Each controller 1 periodically communicates with another controller 1 via an inter-controller communication network CN2 to monitor whether the controller is alive or dead. Blocking means that a function of the controller 1 is stopped.

In order to continuously duplicate and manage the cache data to maintain availability of the cache memory even when the controller 1 is blocked, each controller 1 according to the embodiment includes a degeneracy restoration processing section 1011 (see FIG. 3). The degeneracy restoration processing section 1011 includes an invocation instructor F11, a controller selector F12, and a data duplicator F13, for example. The degeneracy restoration processing section 1011 functions to recreate (restore) the duplication pair of cache data in a case where the controller 1 is blocked due to a failure occurrence or a maintenance work and isolated from the storage device SD (in a degenerated state).

The invocation instructor F11 functions to instruct another controller 1 to reconstruct a structure for duplicating and storing the cache data. The controller selector F12 functions to select a new paired destination controller 1 in place of the blocked controller 1. The controller selector F12 selects a suitable controller 1 according to a controller selection condition F121 which is preset. The data duplicator F13 functions to send the cache data to be duplicated and stored to the controller 1 selected as the new paired destination via the inter-controller communication network CN2 to store the cache data in the cache memory 130 in the controller 1 as the new paired destination.

An explanation is made using the example in FIG. 1. When the controller 1 (CTL #2) detects that the controller 1 (CTL #1) is blocked, the controller 1 (CTL #2) makes the invocation instructor F11 instruct the own controller 1 (CTL #2) and another controller 1 (CTL #3) to invoke the degeneracy restoration processing section 1011.

The controller selector F12 of each of the controllers 1 (CTL #2 and CTL #3) checks whether or not the data paired with the data held in the blocked controller 1 (CTL #1), that is, the data to be duplicated and stored, is stored in the own controller. The controller selector F12 selects the new paired destination controller 1 on the basis of the controller selection condition F121 in a case where the data to be duplicated and stored is stored.

The controller selection condition F121 includes at least one condition based on, for example, a face attribute of the cache memory 130 (whether it is the C face or the N face), a cache memory state transition scheme, the number of host paths for communicating with the host computer 3, the number of HDD paths for communicating with the storing unit 21, and the like.

The data duplicator F13 of each of the controllers 1 (CTL #2 and CTL #3) forwards the duplication target cache data to the controller 1 selected as the new paired destination to store the cache data in the cache memory 130 in the new paired destination controller 1.

As a result, the data stored in the cache slot ST21 (N) in the controller 1 (CTL #2) is stored also in a cache slot ST31 (C) in the controller 1 (CTL #3) to recreate the pair. Similarly, the data stored in the cache slot ST22 in the controller 1 (CTL #2) is stored also in a cache slot ST32 in the controller 1 (CTL #3) to recreate the pair.

Since the data stored in the cache slot ST23 (C) in the controller 1 (CTL #2) and the data stored in the cache slot ST33 (N) in the controller 1 (CTL #3) have no relation with the blocking of the controller 1 (CTL #1), the pair configuration remains without change.

Each controller 1 is a paired source or paired destination in units of LDEV. For example, a certain controller 1 is used as a paired source (e.g., C face) for the data stored in a certain LDEV 24 and, at the same time, used as a paired destination (e.g., N face) for other data stored in another LDEV 24.

The controller 1 may be blocked due to a maintenance work besides a failure occurrence in some cases. In the case that the controller 1 is blocked due to a maintenance work, the controller 1 as a target of that maintenance work notifies each of other controllers 1 of its transition to a blocked state.

Each controller 1 notified of this checks whether or not it holds the data paired with that of the controller 1 as the maintenance work target, that is, whether or not the existing pair holds the cache data to be lost, and in a case of holding the data, each controller 1 selects a new paired destination controller 1.

Each controller 1 other than the controller 1 as the maintenance work target sends and stores the cache data to be recreated in a pair to and in the controller 1 selected as the new paired destination to recreate a pair. The controller 1 after completion of recreating the pair notifies the controller 1 as the maintenance work target of the completion of recreating the pair. The controller 1 as the maintenance work target, when notified of the completion of recreating the pair by another controller 1, transits from a state "during transition to blocked state" to a "blocked" state and is isolated from the storage device SD.

In other words, in the case of being blocked due to a maintenance work, the controller 1 as a maintenance work target instructs each of other controllers 1 to recreate a pair. In contrast, in the case where the controller 1 is blocked due to a failure or the like, the controller 1 first detecting the blocking due to that failure instructs each controller 1 (including the detecting controller) to recreate a pair.

As described above, each controller 1 includes the degeneracy restoration processing section 1011 to form an autonomous distributed system for duplication of the cache data. Therefore, in the embodiment, a normal controller 1 paired with the blocked controller 1 selects the new paired destination controller 1 in place of the blocked controller 1 and forwards the duplication target cache data to the new paired destination controller to recreate a pair.

In the embodiment, each of the controllers 1 constituting the autonomous distributed system determines whether to recreate a cache data pair in units of LDEV and selects the new paired destination controller to recreate the pair. For this reason, in the embodiment, the availability can be improved as compared with a case of managing by one management device in an integrated fashion.

Furthermore, in the embodiment, since the cache data pair is recreated in units of LDEV, the paired destination controller can be flexibly selected.

In the embodiment, since the new paired destination controller is selected on the basis of the controller selection condition F121, a suitable controller can be selected depending on an intended use of the storage device SD or kinds of the data, for example. This allows the high availability of the cache to be achieved with a user usability being maintained.

First Embodiment

A description is given of a first embodiment using FIG. 2 to FIG. 17. FIG. 2 illustrates a hardware configuration of the storage device SD.

A configuration example of the communication network is described. The storage device SD includes multiple controllers 1 and at least one drive box 2, and each controller 1 is coupled with the drive box 2 via a communication network CN3. Each controller 1 is coupled with the host computer (hereinafter, referred to as the host) 3 via a communication network CN1, and the controllers 1 are coupled with each other via the communication network CN2.

The drive box 2 is a device which mounts the storing unit 21 thereon. The drive box 2 includes multiple storing units 21, multiple drive ports 22, a power-supply device not illustrated, and the like, for example. The storing unit 21 can use various devices capable of reading and writing the data such as a hard disk device, a semiconductor memory device, an optical disk device, and a magneto-optical disk device, for example. The storing unit 21 can also use various devices such as a flash memory, an MRAM (Magnetoresistive Random Access Memory), a Phase-Change Memory, a ReRAM (Resistive random-access memory), and a FeRAM (Ferroelectric Random Access Memory), or equivalents of these, for example. Further, various different devices may be included in the drive box 2 as in a case of using both a hard disk device and a flash memory device, for example. In the embodiment, the storing unit 21 is represented as the "HDD", but is not limited to the hard disk device.

The storing units 21, which are respectively coupled to the communication network CN3 via the different multiple drive ports 22, can communicate with the different multiple controllers 1 via different multiple communication paths (HDD paths). Each storing unit 21, which has multiple HDD paths, can communicate with any controller 1 using any of the normal HDD paths, even if a failure occurs in any of the HDD paths. Each controller 1, in a case of not having a HDD path to a desired storing unit 21, can access the relevant storing unit 21 through a controller 1 having the HDD path to the relevant storing unit 21.

A hardware configuration of the controller 1 is described. The controller 1 includes a front-end port 11, a back-end port 12, a CPU (Central Processing Unit) 13, a memory 14, and an interconnect port 15, for example.

The front-end port 11 is a device for communicating with the host 3 via the communication network CN1. The back-end port 12 is a device for coupling with the communication network CN3 to communicate with the storing unit 21 via the drive port 22. The interconnect port 15 is a device for communicating with the respective other controllers 1 via the communication network CN2.

The CPU 13 controls an operation of the controller 1. The CPU 13 reads and executes a predetermined computer program stored in the memory 14 to achieve each function as the controller 1. The CPU 13 performs processing on a command received from the host 3 such as the write command and the read command and sends a processing result to the host 3, for example. Furthermore, the CPU 13 also performs processing for managing the cache data such as the duplication of the dirty data and the destage processing.

The memory 14 stores therein data such as the computer program and a managing table, and further provides a work area to the CPU 13, for example. The memory 14 may be constituted by a single memory medium or multiple kinds of memory media. A description is given of storing content in the memory 14 using FIG. 3 to FIG. 21.

FIG. 3 illustrates a general outline of the storing content in the memory 14. The memory 14 stores therein a microprogram 100. The microprogram 100 includes a cache management program 101, a cache directory 110, a cache slot management table 120, a cache memory 130, and configuration information 140, for example.

Here, although a detailed diagram illustration is omitted, the cache slot management table 120 is a table storing therein the cache slot information with a cache slot number as an index. An address on the cache memory can be uniquely found from the cache slot number. The cache slot information may include a subsequent slot number for managing a queue for a cache slot which is in a state the same as that of the cache slot (free, clean, dirty) and a LDEV slot number of the LDEV 24 corresponding to the cache slot, for example.

The cache management program 101 is a program managing the cache data and includes the degeneracy restoration processing section 1011. The cache management program 101 performs a transition of a state of the cache (free, clean, dirty), staging processing, destage processing, and the like. The degeneracy restoration processing section 1011 is a program recreating the cache data pair which is duplicated and held between the controllers in the case where the controller 1 is blocked due to a failure or a maintenance work.

The cache memory 130 is a storing area storing therein the cache data. The cache memory 130 is partitioned into multiple cache slots and each cache slot has an attribute of any of a C face 131 or an N face 132. The cache data stored in the cache slot is in a state of any of free, dirty, and clean.

FIG. 4 illustrates a configuration example of the cache directory 110. The cache directory 110 includes the number 1101 of LDEVs which uses this cache memory as the C face, the number 1102 of LDEVs which use this cache memory as the N face, information 1103 in units of LDEV for all the LDEVs, a queue terminal 1104 for each cache slot state, and a directory main body 1105, for example.

The queue terminal 1104 for each cache slot state expresses a list of the cache slots in the identical cache slot state in the cache slot information. This queue terminal 1104 is a table storing therein the head cache slot number and the last cache slot number of the list, and a length of the list. The queue terminal 1104 for each cache slot state can be used to find an amount of dirty data and an allocation ratio between the C face and the N face.

The directory main body 1105 is a table for using the LDEV slot number as an index. When the cache slot number is assigned, the directory main body 1105 stores a valid number. When the cache slot is freed, the directory main body 1105 stores an invalid number.

FIG. 5 illustrates a configuration example of the information 1103 in units of LDEV illustrated in FIG. 4. The information 1103 in units of LDEV is prepared for each LDEV, and includes a controller number 11031 of an opposite controller in which the cache data is duplicated and held, a controller number 11032 of an opposite controller in a case where the controller for duplication is changed, and a face attribute information 11033, for example. The controller number 11031 is a number identifying the currently paired opposite controller. The controller number 11032 is a number identifying the new paired destination (the other one of the pair) controller selected by the degeneracy restoration processing section 1011.

FIG. 6 illustrates an example of the configuration information 140 illustrated in FIG. 3. The configuration information 140 manages a configuration relating to a storage structure of the storage device SD. The configuration information 140 includes LDEV information 1401, VDEV information 1402, HDD information 1403, a LDEV/VDEV conversion table 1404, a VDEV/HDD conversion table 1405, controller information 1406, host path information 1407, information 1408 on the number of host paths, HDD access path information 1409, information 1410 on the number of HDD access paths, cache slot transition scheme specifying information 1411, for example. The respective pieces of information are described in detail later.

FIG. 7 illustrates an example of the LDEV information 1401 illustrated in FIG. 6. The LDEV information 1401 is information on the LDEV 24 and includes state information 14011 and size information 14012, for example. The state information 14011 indicates a state of the LDEV 24. The state of the LDEV includes "normal", "blocked", and "during formatting", for example. The size information 14012 indicates a storing capacity of the LDEV 24.

FIG. 8 illustrates an example of the VDEV information 1402 illustrated in FIG. 6. The VDEV information 1402 is information on the VDEV 23 and includes state information 14021 and size information 14022, for example. The state information 14021 indicates a state of the VDEV 23. The state of the VDEV 23 includes "normal", "blocked", and "during formatting", for example. The size information 14022 indicates a storing capacity of the VDEV 23.

FIG. 9 illustrates an example of the HDD information 1403 illustrated in FIG. 6. The HDD information 1403 is information on the storing unit 21 and includes state information 14031, size information 14032, and HDD access path information 14033, for example.

The state information 14031 indicates a state of the storing unit 21. The state of the storing unit 21 includes "normal", "blocked", and "during formatting", for example. The size information 14032 indicates a storing capacity of the storing unit 21. The HDD access path information 14033 is information identifying a path for accessing the storing unit 21. The HDD access path may be abbreviated as the HDD path.

FIG. 10 illustrates, in detail, the HDD access path information 14033 illustrated in FIG. 9. The HDD access path information 14033 includes a path state 140331, a controller number 140332 responsible for path, and a number 140333 of a back-end port in a controller responsible for path, for example.

The path state 140331 indicates a state of the HDD access path (hereinafter, also referred to as the HDD path). The path state includes "normal" and "blocked", for example. The controller number 140332 responsible for path is a number of the controller 1 responsible for the HDD access path. The number 140333 of a back-end port in a controller responsible for path is a number of the back-end port 12 responsible for the HDD access path. The management information illustrated in FIG. 10 can be used to investigate in which back-end port 12 of which controller 1 the HDD access path for accessing to the storing unit 21 is configured.

FIG. 11 illustrates an example of the LDEV/VDEV conversion table 1404 illustrated in FIG. 6. The LDEV/VDEV conversion table 1404 is information managing a correspondence relationship between the LDEV 24 and the VDEV 23, and includes LDEV list terminal information 14041 for each VDEV and list main body information 14042 for each LDEV.

FIG. 12 illustrates an example of the LDEV list terminal information 14041 for each VDEV illustrated in FIG. 11. The LDEV list terminal information 14041 for each VDEV includes a head number 140411 of an LDEV list associated with this VDEV and a length 140412 of the LDEV list. The head number 140411 is a number identifying the head LDEV 24 in the LDEVs 24 generated from the relevant VDEV 23. The length 140412 of the LDEV list indicates the number of LDEVs included in the LDEV list.

FIG. 13 illustrates an example of the list main body information 14042 for each LDEV illustrated in FIG. 11. The list main body information 14042 for each LDEV includes an associated-VDEV number 140421 and a subsequent-LDEV number 140422 in the LDEV list. The associated-VDEV number 140421 is a number identifying the VDEV 23 corresponding to the LDEV list. The subsequent-LDEV number 140422 in the LDEV list is a number of the LDEV 24 positioned next in the LDEV list. In a case of the last LDEV 24 in the list, the LDEV number 140422 is set to an invalid number.

FIG. 14 illustrates an example of the VDEV/HDD conversion table 1405 illustrated in FIG. 6. The VDEV/HDD conversion table 1405 is information managing a correspondence relationship between the VDEV 23 and the storing unit 21, and includes HDD list terminal information 14051 for each VDEV and list main body information 14052 for each HDD.

FIG. 15 illustrates an example of the HDD list terminal information 14051 for each VDEV illustrated in FIG. 14. The HDD list terminal information 14051 includes a head number 140511 of an HDD list associated with this VDEV and a length 140512 of the HDD list. The head number

140511 is a number of the head storing unit 21 in the storing units 21 corresponding to this VDEV 23. The length 1404512 of the HDD list is the number of storing units 21 corresponding to this VDEV 23.

FIG. 16 illustrates an example of the list main body information 14052 for each HDD illustrated in FIG. 14. The list main body information 14052 for each HDD includes an associated-VDEV number 140521 and a subsequent-HDD number 140522 in the HDD list. The associated-VDEV number 140521 is a number identifying the corresponding VDEV 23. The subsequent-HDD number 140522 in the HDD list is a number of the storing unit 21 positioned next in the HDD list. In a case of the last storing unit 21 in the list, the HDD number 140522 is set to an invalid number.

FIG. 17 illustrates an example of the controller information 1406 illustrated in FIG. 6. The controller information 1406 holds a controller state 14061. The controller state includes "normal", "during transition to blocked state", and "blocked", for example.

FIG. 18 illustrates an example of the host path information 1407 illustrated in FIG. 6. The host path information 1407 includes a front-end port number 14071, an LUN (Logical Unit Number) 14072, and an LDEV number 14073. The host path information 1407 defines the LDEV 24 which the host 3 can access via the front-end port 11.

FIG. 19 illustrates an example of the information 1408 on the number of host paths illustrated in FIG. 6. The information 1408 on the number of host paths has a two-dimensional array structure of a controller number and an LDEV number. The information 1408 on the number of host paths manages how many host paths for accessing the respective LDEVs 24 each controller 1 has.

FIG. 20 illustrates an example of the information 1410 on the number of HDD access paths illustrated in FIG. 6. The information 1410 on the number of HDD access paths has a two-dimensional array structure of a controller number and an LDEV number, and manages how many HDD access paths for accessing the storing units 21 corresponding to the respective LDEVs 24 each controller 1 has.

FIG. 21 illustrates an example of the cache slot transition scheme specifying information 1411 illustrated in FIG. 6. The cache slot transition scheme specifying information 1411 specifies a scheme in which an attribute of the cache slot (C face or N face) transits. In other words, the cache slot transition scheme specifying information 1411, when forming a duplication pair for duplicating and holding the cache data, specifies a scheme in which an attribute of the paired destination cache memory (cache slot) transits. The cache slot transition scheme specifying information 1411 associates the LDEV number 14111 with the transition scheme 14112 for managing. In the embodiment, multiple transition schemes (modes) are prepared, as describe later referring to FIG. 29 to FIG. 32. In the embodiment, the cache slot transition scheme can be specified for each LDEV on the basis of an intended use of the LDEV 24 by the host 3, a performance condition required by the host 3, and the like, for example. An LDEV group including multiple LDEVs 24 may be defined, like the LDEV group storing the associated data, to specify the cache slot transition scheme in units of LDEV group. An outline of the cache slot transition scheme is described referring to FIG. 29 to FIG. 33 and a detailed example of the cache slot transition scheme is described referring to FIG. 39 to FIG. 46.

FIG. 22 illustrates a state transition of the cache slot. In FIG. 22, a description is given of transition of states of paired two cache slots. In an initial state (S1) where both cache slots are still not used, the states of the respective cache slots are "free". The state of free indicates a state of being unused.

When the host 3 issues a read command (S2), read target data is read from the storing unit 21, and forwarded to and stored in the cache slot in the C face of the cache slots in the free state. This changes the cache slot in the C face from the free state to the clean state (S3). The clean state is a state where the data is held in both the cache memory and the storing unit. When the controller 1 frees the cache slot in the clean state (S4), that cache slot transits from the clean state to the free state (S1).

In contrast, when the host 3 issues a write command (S5), the write data received from the host 3 is stored in the cache slot in the C face. This allows the cache slot in the C face to transit from the free state to the dirty state (S7). At the same time, the write data stored in the cache slot in the C face is forwarded to and stored in the cache slot in the N face which is paired with the cache slot in the C face. This allows also the cache slot in the N face to transit from the free state to the dirty state (S7). As described above, in order to safely duplicate and hold the cache data, the cache slot in the C face and the cache slot in the N face are included in the controllers 1 different from each other.

The controller 1 performs the destage processing at a predetermined timing. When the controller 1 forwards and writes the write data stored in the cache slot in the C face to and into the storing unit 21 corresponding to the write destination LDEV 24 (S8), the cache slot in the C face transits from the dirty state to the clean state (S3). At the same time, the cache slot in the N face does not need to hold the write data any more, and therefore, transits from the dirty state to the free state (S3).

Next, a description is given of a case where the controller 1 is blocked due to a failure or a maintenance work to lose the pair for duplicating and holding the cache data by use of the cache slot in the C face and the cache slot in the N face.

In a case where the controller 1 including the cache slot in the C face is blocked (S9), the cache slot in the C face cannot be used (S10). Then, the controller 1 including the remaining cache slot in the N face invokes the degeneracy restoration processing section 1011 to select the new paired destination controller and re-duplicate the cache data (S11).

In a case where the controller 1 including the cache slot in the N face is blocked (S12), the cache slot in the N face cannot be used (S13). Then, the controller 1 including the remaining cache slot in the C face invokes the degeneracy restoration processing section 1011 to select the new paired destination controller and re-duplicate the cache data (S14).

FIG. 23 illustrates processing in the case where the controller is blocked due to a failure occurrence. This processing is periodically performed by each controller 1.

The controller 1, when detecting that another controller 1 is blocked because of disconnection of heartbeat communication, for example (S20), sets the controller state 14061 of the controller having the failure occurrence (failed controller) (see FIG. 17) to "blocked" (S21). Then, the controller 1 instructs normal controllers other than the failed controller to invoke the degeneracy restoration processing section 1011 (S22).

FIG. 24 illustrates processing in the case where the controller is blocked due to a maintenance work. This processing is performed by the controller 1 as the maintenance work target when the maintenance work is started. Hereinafter, the controller 1 as a maintenance work target is called a maintenance target controller 1.

The maintenance target controller 1 sets the own controller state 14061 to "during transition to blocked state" (S30). The maintenance target controller 1 instructs other normal controllers to invoke the degeneracy restoration processing section 1011 (S31).

The maintenance target controller 1 after instructing at step S31 waits for a processing completion notification from each of the instructed controllers (S32). The maintenance target controller 1, when receiving the processing completion notifications from the all instructed controllers, determines that the duplication pair of cache data is recreated in the storage device SD and sets the own controller state 14061 to "blocked" (S33). In other words, in the maintenance work where a blocked period can be intentionally adjusted, the maintenance target controller 1 manages recreating of the duplication pair.

FIG. 25 is a main flowchart illustrating the processing of the degeneracy restoration processing section 1011. This processing is performed in units of LDEV when any processing in FIG. 23 or FIG. 24 invokes the degeneracy restoration processing section 1011. Hereinafter, the degeneracy restoration processing section 1011 may be abbreviated as the processing section 1011.

First, the processing section 1011 acquires the face attribute information to be stored in the cache directory for each LDEV and a number of the opposite controller for forming the cache duplication pair (S40).

The processing section 1011 searches the controller information 1406 by the number of the opposite controller to check whether or not a state of the opposite controller is "blocked" (S41). The processing section 1011, if determining that the state of the opposite controller is not "blocked" (S41: NO), checks whether or not the state of the opposite controller is "during transition to blocked state" (S42).

In a case where the state of the opposite controller is "blocked" (S41: YES) or "during transition to blocked state" (S42: YES), the processing section 1011 performs cache data duplication processing (S43). The cache data duplication processing is described later in detail.

In a case where the state of the opposite controller is in neither "blocked" nor "during transition to blocked state" (S41: NO, AND S42: NO), the processing section 1011 specifically does nothing and determines whether or not the all LDEVs 24 are completed in the processing (S44). The all LDEVs 24 mean the LDEVs related to the controllers 1 each of which is provided with the processing section 1011.

The processing section 1011, if determining that the all LDEVs 24 to be processed are completed in this processing (S44: YES), normally ends the processing. In contrast, the processing section 1011, if determining that an unprocessed LDEV 24 remains (S44: NO), selects the next LDEV 24 and returns to step S40.

FIG. 26 is a flowchart illustrating, in detail, the cache data duplication processing (S43) illustrated in FIG. 25. In this processing, from the main flowchart illustrated in FIG. 25, a number and face attribute information of a processing target LDEV are input. The processing target LDEV is a LDEV for which the data is held in the controller blocked (or to be blocked) and which is affected by the controller blockage.

The processing section 1011 performs processing for selecting the new paired destination controller (S50). The processing at step S50 is described later in detail referring to FIG. 34 to FIG. 38. The processing section 1011 configures the controller number and face attribute information returned from step S50 in the information 1103 in units of LDEV illustrated in FIG. 5 (S51).

The processing section 1101 searches the cache directory for the cache slot already allocated to the target LDEV 24 (S52) to determine whether or not the already allocated cache slot is found (S53).

The processing section 1011, if finding the cache slot already allocated to the target LDEV (S53: YES), investigates a state of the found cache slot (S54). The processing section 1011 determines whether or not the state of the found cache slot is "C face is dirty" (S55). The state "C face dirty" means that the attribute of the cache slot storing therein the data of the target LDEV is the C face and the data stored therein is the dirty data existing in only the cache memory.

The processing section 1011, if determining that the state of the cache slot already allocated to the target LDEV is "C face is dirty" (S55: YES), proceeds to step S57, and if not (S55: NO), proceeds to step S56.

The processing section 1011 determines whether or not the state of the cache slot already allocated to the target LDEV is "N face is dirty" (S56). The state "N face dirty" means that the attribute of the cache slot storing therein the data of the target LDEV is the N face and the data stored there is the dirty data.

The processing section 1011, if determining that the state of the cache slot already allocated to the target LDEV is "N face is dirty" (S56: YES), proceeds to step S57, and if not (S56: NO), proceeds to step S58.

On the basis of a result of "data duplication processing in a duplication source controller" performed at step S57 (described later in FIG. 27), the processing section 1011 determines whether or not the recreating of the duplication pair has succeeded for the cache slot already allocated to the target LDEV (S58).

The processing section 1011, if determining that the recreating of the duplication pair has succeeded (S58: YES), searches for the next cache slot allocated to the target LDEV (S59) and returns to step S52. In contrast, the processing section 1011, if determining that the recreating of the duplication pair has failed for the target cache slot (S58: NO), waits for a predetermined time period, and thereafter, returns to step S52 to process that cache slot.

In a case where the cache data duplication cannot be completed within a certain time period because of a high processing load put on the controller 1 which is selected as the new paired destination, it is determined at step S58 that the recreating of the duplication pair has failed. For this reason, the processing section 1011 performs again the processing of steps S52 to S57 after a time (S60).

In a case where the state of the cache slot already allocated to the target LDEV is "C face is dirty" (S55: YES) or "N face is dirty" (S56: YES), the processing section 1011 performs "the data duplication processing in the duplication source controller" (S57).

FIG. 27 is a flowchart illustrating, in detail, step S57 illustrated in FIG. 26. The processing section 1011 performs "the data duplication processing in a duplication destination controller" (S70). This processing is processing for forwarding the cache data to the new paired destination controller to store in the cache memory. This processing is described later in detail referring to FIG. 28. For performing the processing in FIG. 27, input from the processing in FIG. 26 are the face attribute of the cache slot in the duplication source, the face attribute of the cache slot in the duplication destination, the target LDEV number, the duplication target data, and a number of the duplication destination controller.

The processing section 1011 waits for the completion of the processing requested for the duplication destination controller (hereinafter, referred to as the controller selected as the new paired destination) (S71). The processing section 1011 determines whether or not the data duplication in the duplication destination controller has succeeded, that is, whether or not the recreating of the duplication pair has succeeded for the target cache data (S72).

The processing section 1011, if determining that the data duplication in the duplication destination controller has succeeded (S72: YES), returns that the duplication ended normally to the cache data duplication processing illustrated in FIG. 26 (S73).

In contrast, the processing section 1011, if determining that the data duplication in the duplication destination controller has failed (S72: NO), subjects the cache data held by the duplication source controller to the destage processing (S74). The processing section 1011 waits for completion of the destage processing on the cache data which was a target to be recreated into the duplication pair, the destage processing being performed in the controller 1 provided with the own processing section (S75). In a case where the cache data cannot be duplicated and held between the different controllers (S72: NO), the destage processing is performed such that the cache data is written into the storing unit 21 and reliability of the storage device SD is maintained.

The processing section 1011 determines whether or not the destage processing has succeeded (S76). In a case where the destage processing has succeeded (S76: YES), the processing section 1011 proceeds to step S73 and returns that the destage processing ended normally to the processing in FIG. 26. In contrast, the processing section 1011 returns that the destage processing ended abnormally to the processing in FIG. 26 (S77).

FIG. 28 is a flowchart illustrating, in detail, step S70 illustrated in FIG. 27. This processing is performed by the cache management program 101 of the duplication destination controller. For performing this processing, received from the processing in FIG. 27 are the target LDEV number, a write destination address in the target LDEV for the duplication target data, the duplication source controller number, the data to be stored in the cache slot in the duplication destination controller, and a face attribute of the cache slot in the duplication destination controller.

The cache management program 101 allocates the cache slot to the target data within a certain time period (S80). The cache management program 101 determines whether or not the cache slot can be allocated to the target data within a certain time period (S81). In a case where a free space is insufficient in the cache memory, the duplication destination controller increases the free space in the cache memory by performing the destage processing or the like. However, in a case where the destage processing cannot be performed or the free space is still insufficient even by performing the destage processing, the cache slot cannot be allocated to the target data.

In a case where the cache slot cannot be allocated to the target data within a certain time period (S81: NO), the cache management program 101 of the duplication destination controller determines that the data duplication has failed (S82) and returns to the processing in FIG. 27.

In a case where the cache slot can be allocated to the target data (S81: YES), the cache management program 101 stores the target data in the allocated cache slot (S83).

The cache management program 101 determines whether or not the face attribute of the cache in the duplication destination is specified to be the C face (S84), and if specified to be the C face (S84: YES), configures the state of the cache slot allocated to the target data as "C face dirty" (S85) and returns to the processing in FIG. 27.

The cache management program 101, if determining that the face attribute of the cache in the duplication destination is not specified to be the C face (S84: NO), determines whether or not that face attribute is specified to be the N face (S86). The cache management program 101, if determining that the face attribute of the cache in the duplication destination is specified to be the N face (S86: YES), configures the state of the cache slot allocated to the target data as "N face dirty" (S87) and returns to the processing in FIG. 27. If "NO" is determined at step S86, the processing is returned to that in FIG. 27.

FIG. 29 illustrates a first example of the cache slot transition scheme illustrated in FIG. 21. In the transition scheme in FIG. 29, the new paired destination controller is selected so that the cache slot is obtained which has the face attribute the same as that of the cache slot included in the blocked controller. Hereinafter, a description is given of the blockage due to a failure occurrence as an example, but the same goes for the blockage due to a maintenance work.

In the initial state before the failure occurrence or before starting of the maintenance work, the cache slot in "C face dirty" is paired with the cache slot in "N face dirty" to hold the identical data (S90).

If a failure occurs in the controller 1 provided with the cache slot in the N face (S91), the cache slot in the N face cannot be used and the data duplication pair is lost (S92). For this reason, the processing section 1011 selects the new paired destination controller to duplicate the data so that the cache slot is used in the same attribute (N face) as the unusable cache slot (S93). This allows the cache slot in the C face in the duplication source controller to be paired with the cache slot in the N face included in the new paired destination controller (S94).

Similarly, if a failure occurs in the controller 1 provided with the cache slot in the C face (S95), the cache slot in the C face cannot be used and the data duplication pair is lost (S96). For this reason, the processing section 1011 selects the new paired destination controller to duplicate the data so that the cache slot is used in the same attribute (C face) as the unusable cache slot (S97). This allows the cache slot in the N face in the duplication source controller to be paired with the cache slot in the C face included in the new paired destination controller (S98).

FIG. 30 illustrates a second example of the cache slot transition scheme. In the transition scheme in FIG. 30, the cache slot included in the new paired destination controller is used always as the cache slot in the N face.

In the initial state, the cache slot in "C face dirty" is paired with the cache slot in "N face dirty" to hold the identical data (S100).

If a failure occurs in the controller 1 provided with the cache slot in the N face (S101), the cache slot in the N face cannot be used and the data duplication pair is lost (S102). For this reason, the processing section 1011 selects the new paired destination controller to duplicate the data so that the cache slot is used in the N face (S103). This allows the cache slot in the C face in the duplication source controller to be paired with the cache slot in the N face included in the new paired destination controller (S104).

In contrast, if a failure occurs in the controller 1 including the cache slot in the C face (S105), the cache slot in the C face cannot be used and the data duplication pair is lost (S106).

The duplication source controller includes the cache slot in the N face, but always searches for the cache slot in the N face in this transition scheme. Then, the processing section 1011 in the duplication source controller changes the face attribute of the cache slot in the duplication source controller from the N face to the C face (S107). As a result, the state is obtained where the cache slot in the C face normally functions and the cache slot in the N face is lost (S108).

The processing section 1011 selects the new paired destination controller to duplicate the data so that the cache slot is used in the N face (S109). This allows the cache slot in the C face in the duplication source controller to be paired with the cache slot in the N face in the new paired destination controller (S110).

FIG. 31 illustrates a third example of the cache slot transition scheme. In the transition scheme in FIG. 31, the cache slot included in the new paired destination controller is used always as the cache slot in the C face.

In the initial state, the cache slot in "C face dirty" is paired with the cache slot in "N face dirty" to hold the identical data (S120).

If a failure occurs in the controller 1 provided with the cache slot in the C face (S121), the cache slot in the C face cannot be used and the data duplication pair is lost (S122). The processing section 1011 selects the new paired destination controller to duplicate the data so that the cache slot is used in the C face (S123). This allows the cache slot in the C face in the duplication source controller to be paired with the cache slot in the C face included in the new paired destination controller (S124).

In contrast, if a failure occurs in the controller 1 including the cache slot in the N face (S125), the cache slot in the N face cannot be used and the data duplication pair is lost (S126).

The duplication source controller includes the cache slot in the C face, but always searches for the cache slot in the C face in this transition scheme. Then, the processing section 1011 in the duplication source controller changes the face attribute of the cache slot in the duplication source controller from the C face to the N face (S127). By doing so, the state is obtained where the cache slot in the N face normally functions and the cache slot in the C face is lost (S128).

The processing section 1011 selects the new paired destination controller to duplicate the data so that the cache slot is used in the C face (S129). This allows the cache slot in the N face in the duplication source controller to be paired with the cache slot in the C face in the new paired destination controller (S130).

As described in FIG. 30, even in the case where any of the C face and the N face of the initial pair cannot be used, the controller is eventually selected so as to use the cache slot in the N face in any case in the scheme that the controller in which the cache slot in the N face is used is always searched for, which allows the processing to be used in common. This allows a control program to be simplified. Similarly, also in the scheme described in FIG. 31, the controller is selected so as to use the cache slot in the C face, which allows the processing to be used in common and the control program to be simplified.

FIG. 32 illustrates a fourth example of the cache slot transition scheme. In transition scheme in FIG. 32, in the case where the controller provided with the cache slot in the C face is blocked, a controller to be used as the cache slot in the C face is firstly determined. In this transition scheme, in a case where the cache slot determined to be used as the cache slot in the C face has an attribute of the N face, the attribute is changed into the C face.

In the initial state, the cache slot in "C face dirty" is paired with the cache slot in "N face dirty" to hold the identical data (S140). If a failure occurs in the controller including the cache slot in the N face (S141), the cache slot in the N face cannot be used and the data duplication pair is lost (S142).

The processing section 1011 selects the new paired destination controller to duplicate the data so that the cache slot is used in the N face (S143). This allows the cache slot in the C face in the duplication source controller to be paired with the cache slot in the N face included in the new paired destination controller (S144).

In contrast, if a failure occurs in the controller 1 including the cache slot in the C face (S145), the cache slot in the C face cannot be used and the data duplication pair is lost (S146). Since the controller to be blocked has the cache slot in the C face with respect to the target cache data, the duplication source controller has the cache slot in the N face.

The processing section 1011, when storing the target cache data, determines which of other controllers is a controller suitable for being provided with the cache slot in the C face (S147).

The processing section 1011, in a case of determining that the own controller is to be provided with the cache slot in the C face (S148), changes the attribute of the cache slot in the own controller from the N face to the C face (S149). As a result, the duplication source controller has the cache slot in the C face. Therefore, the new paired destination controller is to be provided with the cache slot in the N face (S150).

The processing section 1011 selects the new paired destination controller to duplicate the data so that the cache slot is used in the N face (S151). This allows the cache slot in the C face in the duplication source controller to be paired with the cache slot in the N face in the new paired destination controller (S152).

On the other hand, the processing section 1011, if determining that a controller suitable for having the cache slot in the C face is controller other than the own controller (duplication source controller) (S153), selects a controller so as to use the cache slot in the C face to duplicate the data (S154). This allows the cache slot in the N face in the duplication source controller to be paired with the cache slot in the C face in the new paired destination controller (S155).

FIG. 33 illustrates a fifth example of the cache slot transition scheme. In transition scheme in FIG. 32, in the case where the controller provided with the cache slot in the N face is blocked, a controller to be used as the cache slot in the N face is firstly determined. In this transition scheme, in a case where the cache slot determined to be used as the cache slot in the N face has an attribute of the C face, the attribute is changed into the N face.

In the initial state, the cache slot in "C face dirty" is paired with the cache slot in "N face dirty" to hold the identical data (S160). If a failure occurs in the controller including the cache slot in the C face (S161), the cache slot in the C face cannot be used and the data duplication pair is lost (S162).

The processing section 1011 selects the new paired destination controller to duplicate the data so that the cache slot is used in the C face (S163). This allows the cache slot in the C face in the duplication source controller to be paired with the cache slot in the C face included in the new paired destination controller (S164).

In contrast, if a failure occurs in the controller 1 including the cache slot in the N face (S165), the cache slot in the N face cannot be used and the data duplication pair is lost (S166). Since the controller to be blocked has the cache slot in the N face with respect to the target cache data, the duplication source controller has the cache slot in the C face.

The processing section 1011, when storing the target cache data, determines which of other controllers is a controller suitable for being provided with the cache slot in the N face (S167).

The processing section 1011, if determining that the own controller is to be provided with the cache slot in the N face (S168), changes the attribute of the cache slot in the own controller from the C face to the N face (S169). As a result, the duplication source controller has the cache slot in the N face. Therefore, the new paired destination controller is to be provided with the cache slot in the C face (S170).

The processing section 1011 selects the new paired destination controller to duplicate the data so that the cache slot is used in the C face (S171). This allows the cache slot in the N face in the duplication source controller to be paired with the cache slot in the C face in the new paired destination controller (S172).

On the other hand, the processing section 1011, if determining that a controller suitable for having the cache slot in the N face is a controller other than the own controller (duplication source controller) (S173), selects a controller so as to use the cache slot in the N face to duplicate the data (S174). This allows the cache slot in the C face in the duplication source controller to be paired with the cache slot in the N face in the new paired destination controller (S175).

FIG. 34 illustrates an outline of the controller selection processing at step S50 illustrated in FIG. 26. The controller selection processing (S50) can select a method from multiple (e.g., four) selection methods. The controller selection method can be adequately selected depending on the performance required by the host 3, an intended use or kinds of the storage device SD, and the like, for example, and can be also changed in midstream. The controller selection method is described later in detail referring to FIG. 35 to FIG. 38.

FIG. 35 illustrates an example of a first controller selection method. In the first controller selection method, the controller is selected based on how many access paths (HDD paths) directed to the storing unit 21 in which the target cache data is finally stored and how low a cache load is. The cache data as the target to be recreated into a pair is called the target cache data, the LDEV 24 as a destination in which the target cache data is stored is called the target LDEV 24, and the storing unit 21 constituting the target LDEV 24 is called a target storing unit 21.

The processing section 1011 detects the number of HDD paths through which each controller 1 can directly access the storing unit 21 (target storing unit 21) corresponding to the target LDEV 24 from the information 1410 on the number of HDD access paths illustrated in FIG. 20 (S180).

Here, the HDD path through which the controller 1 can directly access the target storing unit 21 is an HDD path through which the controller 1 can access, without via another controller, directly the target storing unit 21 to read and write the data. Each controller in the embodiment, even in a case of not having the HDD path through which it directly accesses the target storing unit 21, can read and write the data from and into the target storing unit 21 via another controller which can directly access the target storing unit 21. However, if a certain controller reads and writes the data from and into the target storing unit 21 via another controller, a load on that another controller increases. For this reason, the embodiment focuses on the number of HDD paths through which the target storing unit 21 can be directly accessed, for sort in descending order of the number (S180).

The processing section 1011 determines whether or not the cache load of the controller is equal to or smaller than a threshold in descending order of the number of HDD paths through which the target storing unit 21 is directly accessed, and selects the controller of which the cache load is firstly determined to be equal to or smaller than the threshold (S181). However, excluded from the selection target at step S181 are the controller provided with the processing section 1011 and the controller in any state of "blocked" or "during transition to blocked state". The cache load is an amount of the cache memory 130 usage. To be more specifically, the cache load is an amount of the dirty data in the data stored in the cache memory 130.

FIG. 36 illustrates a second controller selection method. The second controller selection method assumes the case that the cache slot in the C face is used to send and receive the data to and from the host 3, and the cache slot in the N face is used to send and receive the data to and from the storing unit 21.

The processing section 1011 determines the attribute of the cache slot through attribute determination processing (S190). The attribute determination processing is described later in detail referring to FIG. 39 to FIG. 46. The processing section 1011 determines whether or not a controller in which the cache slot in the N face is used is determined to be searched for as a result to the attribute determination processing (S191). Searching for the controller in which the cache slot in the N face is used may be expressed as searching for the controller in the N face. Similarly, searching for the controller in which the cache slot in the C face is used may be expressed as searching for the controller in the C face.

The processing section 1011, in a case of not searching for the controller in the N face (S191: NO), that is, in a case that the controller in the C face is determined to be searched for, detects the number of host paths for accessing the target LDEV for each controller for sort in descending order of the number of host paths (S192). The processing section 1011 can detect the number of host paths directed to the target LDEV 24 for each controller from the information 1408 on the number of host paths illustrated in FIG. 19.

The processing section 1011 determines whether or not the cache load of each controller is equal to or smaller than a threshold in descending order of the number of host paths, and selects the controller of which the cache load is firstly determined to be equal to or smaller than the threshold (S193). However, excluded from the selection target at step S193 are the controller provided with the processing section 1011 and the controller in any state of "blocked" or "during transition to blocked state".

In contrast, the processing section 1011, in a case that the controller in the N face is determined to be searched for (S191: YES), checks for each controller the number of HDD paths through which the storing unit 21 corresponding to the target LDEV 24 can be directly accessed, and sorts the controllers in descending order of the number of HDD paths (S194).

The processing section 1011 determines whether or not the cache load of each controller is equal to or smaller than a threshold in descending order of the number of HDD paths, and selects the controller of which the cache load is firstly determined to be equal to or smaller than the threshold (S195). However, excluded from the selection target at step S193 are the controller provided with the processing section 1011 and the controller in any state of "blocked" or "during transition to blocked state".

In this way, in the second controller selection method, in the case of searching for the controller in the C face, the searching is made on the basis of the number of host paths directed to the target LDEV and the cache load, and in the case of searching for the controller in the N face, the searching is made on the basis of the number of HDD paths directed to the storing unit 21 corresponding to the target LDEV and the cache load. Therefore, it is possible to select the controller suitable for a type of usage of the cache slot in the C face and the controller suitable for a type of usage of the cache slot in the N face, which allows a response performance of the storage device SD to be maintained.

FIG. 37 illustrates a third controller selection method. The third controller selection method assumes the case that the cache slot in the C face is used to send and receive the data to and from both the host 3 and the storing unit 21. In this case, the cache slot in the N face is of the cache for backup of the target cache data.

The processing section 1011 determines whether or not the attribute determination processing determines (S200) that the controller in the N face is searched for (S201).

The processing section 1011, in a case of determining that searching for the controller in the N face is not determined (S201: NO), that is, in a case that the controller in the C face is determined to be searched for, detects the number HP of host paths for accessing the target LDEV for each controller (S202). This detection is made using the information 1408 on the number of host paths illustrated in FIG. 19.

Furthermore, the processing section 1011 detects for each controller the number SP of HDD paths directed to the storing unit corresponding to the target LDEV (S203). This detection is made using the information 1410 on the number of HDD access paths illustrated in FIG. 20.

The processing section 1011 calculates for each controller a sum of the number HP of host paths and the number SP of HDD paths, checks whether or not the cache load is equal to or smaller than a predetermined threshold in descending order of the sum (HP+SP), and selects the controller of which the cache load is firstly determined to be equal to or smaller than the threshold (S204). However, excluded from the selection target at step S204 are the controller provided with the processing section 1011 and the controller in any state of "blocked" or "during transition to blocked state".

If the attribute determination processing determines that the controller in the N face is searched for (S201: YES), the processing section 1011 selects the controller of which the cache load is the smallest (S205). Since the third controller selection method uses the cache slot in the N face for merely data backup, the response performance is not necessary to be called into question. However, excluded from the selection target also at step SS205 are the controller provided with the processing section 1011 and the controller in any state of "blocked" or "during transition to blocked state".

In this way, in the third controller selection method, in the case of searching for the controller in the C face, the searching is made on the basis of the sum of the number of host paths and the number of HDD paths corresponding to the target LDEV, which allows the response performance of the storage device SD to be maintained.

FIG. 38 illustrates a fourth controller selection method. In the fourth controller selection method, the controller is selected based on a ratio of the cache slot in the C face or ratio of the cache slot in the N face allocated to the cache memory 130, and the cache load.

The processing section 1011 determines whether or not the attribute determination processing determines that the controller in the N face is searched for (S211).

In a case where the controller in the N face is not determined to be searched for (S211: NO), that is, the controller in the C face is determined to be searched for, the processing section 1011 obtains a sum SL1 of the number of cache slots in "C face clean" and the number of cache slots in "C face dirty", and the total number TS of cache slots included in the cache memory from all normal controllers other than the own controller (S212). In other words, the sum SL1 at step S212 means a sum of the cache slots used in the C face. The own controller is the controller in which the processing section 1011 that is a subject performing this processing operates.

The processing section 1011 sorts, in ascending order, values obtained by dividing the sum SL1 of the cache slots used in the C face by the total number TS of cache slots, checks whether or not the cache load is equal to or smaller than a predetermined threshold, and selects the controller of which the cache load is firstly determined to be equal to or smaller than the threshold (S213).

In contrast, in a case where the controller in the N face is determined to be searched for (S211: YES), the processing section 1011 obtains the number SL1 of cache slots in "N face dirty" and the total number TS of cache slots from all normal controllers other than the own controller (S214).

The processing section 1011 sorts, in ascending order, values obtained by dividing an amount SL1 of usage of "N face dirty" by the total number TS of cache slots, checks whether or not the cache load is equal to or smaller than a predetermined threshold, and selects the controller of which the cache load is firstly determined to be equal to or smaller than the threshold (S231).

In this way, in the fourth controller selection method, in the case of searching for the controller in the C face, the controller is selected which is less in the amount of usage in the C face and of which the cache load is equal to or smaller than the threshold. By doing so, the cache slots used in the C face are substantially uniformly dispersed among the controllers in the storage device SD. The cache slots in the C face higher in a use frequency are dispersed among the controllers, which can prevent deviation of the load or performance among the controllers. Since the cache slot used in the N face is to be freed as a result of the destage processing and become in the free state at some point in time, it is not so necessary to uniformly disperse the cache slots in the N face among the controllers.

FIG. 39 is a flowchart illustrating, in detail, the attribute determination processing illustrated at step S190 in FIG. 36, at step S200 in FIG. 37, and at step S210 in FIG. 38. In the embodiment, the attribute is determined in accordance with the cache slot transition scheme illustrated in FIG. 29 to FIG. 33.

In a case where it is selected in advance that the cache slot having the same attribute as that of the cache slot in the blocked controller is searched for (S220), the processing section 1011 performs a first attribute determination method illustrated in FIG. 40 (S221).

Refer to FIG. 40. The first attribute determination method starts when the attribute of the cache slot in the duplication source controller is input. The processing section 1011 determines whether or not the input attribute is the N face (S240). In a case where the input attribute is the N face (S240: YES), it is output that the attribute of the cache slot included in the duplication source controller is the N face and the attribute of the cache slot used in a searched target controller is the C face.

Hereinafter, the attribute of the cache slot included in the duplication source controller is abbreviated as the duplication source controller attribute and the attribute of the cache slot used in the searched target controller is abbreviated as the searched target controller attribute.

In a case where the input attribute is not the N face (S240: NO), it is output that the duplication source controller attribute is the C face and the searched target controller attribute is the N face.

Return to FIG. 39. In a case where it is selected as the cache slot transition scheme that the cache slot in the N face is always searched for (S222), the processing section 1011 performs a second attribute determination method illustrated in FIG. 41 (S223).

Refer to FIG. 41. In the second attribute determination method, regardless of whether the duplication source controller attribute is the N face or the C face, it is always output that the duplication source controller attribute is the C face and the searched target controller attribute is the N face (S250).

Return to FIG. 39. In a case where it is selected as the cache slot transition scheme that the cache slot in the C face is always searched for (S224), a third attribute determination method illustrated in FIG. 42 is performed (S225).

Refer to FIG. 42. In the third attribute determination method, regardless of whether the duplication source controller attribute is the C face or the N face, it is always output that the duplication source controller attribute is the N face and the searched target controller attribute is the C face (S260).

Return to FIG. 39. In a case where it is configured as the cache slot transition scheme that the controller having more host paths is selected as the controller in the C face (S226), the processing section 1011 performs a fourth attribute determination method illustrated in FIG. 43 (S227).

Refer to FIG. 43. In the fourth attribute determination method, the processing section 1011 determines whether or not the input attribute, that is, the attribute of the cache slot included in the duplication source controller, is the N face (S270).

In the case that the duplication source controller attribute is the N face (S270: YES), the processing section 1011 detects the number of host paths directed to the target LDEV for each controller (S271). The processing section 1011 sorts the controllers in descending order of the number of host paths, checks whether or not the cache load is equal to or smaller than a predetermined threshold, and selects, as a candidate of the controller used in the C face, the controller of which the cache load is firstly determined to be equal to or smaller than the threshold (S272).

The processing section 1011 determines whether or not the controller candidate selected at step S272 is the own controller (S273). The processing section 1011, in a case of not selecting the own controller as the candidate (S273: NO), outputs that the duplication source controller attribute is the N face and the searched target controller attribute is the C face (S274). The processing section 1011, in a case of selecting the own controller as the candidate (S273: YES), outputs that the duplication source controller attribute is the C face and the searched target controller attribute is the N face (S275).

On the other hand, in a case where the duplication source controller attribute is not the N face (S270: NO), the processing section 1011 outputs that the duplication source controller attribute is the C face and the searched target controller attribute is the N face (S276).

Return to FIG. 39. In a case where it is configured as the cache slot transition scheme that the controller having a larger sum of the number of host paths and the number of HDD paths is selected as the controller in the C face (S228), the processing section 1011 performs a fifth attribute determination method illustrated in FIG. 44 (S229).

Refer to FIG. 44. In the fifth attribute determination method, the processing section 1011 determines whether or not the input attribute is the N face (S280). In the case that the input attribute is the N face (S280: YES), that is, the duplication source controller attribute is N face, the processing section 1011 detects the number HP of host paths directed to the target LDEV for each controller (S281). Subsequently, the processing section 1011 detects for each controller the number SP of HDD paths through which the storing unit 21 corresponding to the target LDEV can be directly accessed (S282).

The processing section 1011 sorts the controllers in descending order of the sum of the number HP of host paths and the number SP of HDD paths, checks whether or not the cache load is equal to or smaller than a predetermined threshold, and selects, as a candidate of the controller in the C face, the controller of which the cache load is firstly determined to be equal to or smaller than the threshold (S283). However, excluded from the selection target at step S283 is the controller in any state of "blocked" or "during transition to blocked state".

The processing section 1011 determines whether or not the own controller is selected as a candidate of the controller in the C face (S284). In a case where controller other than the own controller is selected as a candidate of the controller in the C face (S284: NO), the processing section 1011 outputs that the duplication source controller attribute is the N face and the searched target controller attribute is the C face (S285).

In the case of selecting the own controller as the controller candidate in the C face (S284: YES), the processing section 1011 outputs that the duplication source controller attribute is the C face and the searched target controller attribute is the N face (S286).

On the other hand, in a case where the input attribute is not the N face (S280: NO), that is, the duplication source controller attribute is C face, the processing section 1011 outputs that the duplication source controller attribute is the C face and the searched target controller attribute is the N face (S287).

Return to FIG. 39. In a case where it is configured as the cache slot transition scheme that the controller having more HDD paths is selected as the controller in the N face (S230), the processing section 1011 performs a sixth attribute determination method illustrated in FIG. 45 (S231).

Refer to FIG. 45. In the sixth attribute determination method, the processing section 1011 determines whether or not the input attribute is the C face (S290). In the case that the input attribute is the C face (S290: YES), the processing section 1011 detects for each controller the number of HDD paths through which the storing unit 21 corresponding to the target LDEV can be directly accessed (S291). The processing section 1011 sorts the controllers in descending order of the number of HDD paths, checks whether or not the cache load is equal to or smaller than a predetermined threshold, and selects, as a candidate of the controller in the N face, the controller of which the cache load is firstly determined to be equal to or smaller than the threshold (S292). However, excluded from the selection target at step S292 is the controller in any state of "blocked" or "during transition to blocked state".

The processing section 1011 determines whether or not the own controller is selected as the controller candidate in the N face (S293). The processing section 1011, in a case of not selecting the own controller (S293: NO), outputs that the duplication source controller attribute is the C face and the searched target controller attribute is the N face (S294).

In contrast, in the case of selecting the own controller as the controller candidate in the N face (S293: YES), the processing section 1011 outputs that the duplication source controller attribute is the N face and the searched target controller attribute is the C face (S295).

On the other hand, in a case where the input attribute is not the C face (S290: NO), the processing section 1011 outputs that the duplication source controller attribute is the N face and the searched target controller attribute is the C face (S296).

Return to FIG. 39. In a case where it is configured as the cache slot transition scheme that the controller of which the cache load is the smallest is selected as the controller in the N face, the processing section 1011 determines whether or not the input attribute is the C face (S300).

In the case that the input attribute is the C face (S300: YES), the processing section 1011 selects the controller of which the cache load is the smallest as the controller candidate in the N face (S301). However, excluded from the selection target at step S301 is the controller in any state of "blocked" or "during transition to blocked state".

The processing section 1011 determines whether or not the own controller is selected as the controller candidate in the N face (S302). The processing section 1011, in a case of not selecting the own controller (S302: NO), outputs that the duplication source controller attribute is the C face and the searched target controller attribute is the N face (S303). In contrast, in the case of selecting the own controller as the controller candidate in the N face (S302: YES), the processing section 1011 outputs that the duplication source controller attribute is the N face and the searched target controller attribute is the C face (S304).

In the storage device SD according to the embodiment configured as described above, each controller 1 includes the degeneracy restoration processing section 1011 to form an autonomous distributed system for duplication of the cache data. Therefore, a normal controller 1 paired with the blocked controller 1 selects by itself the new paired destination controller 1 in place of the blocked controller 1 and forwards the duplication target cache data to the new paired destination controller to recreate a pair.

In the embodiment, each of the controllers 1 determines whether to recreate a cache data pair in units of LDEV and selects the new paired destination controller to recreate the pair. For this reason, in the embodiment, the availability can be improved as compared with a case of managing by one management device in an integrated fashion.

In the embodiment, since the cache data pair is recreated in units of LDEV, the paired destination controller can be flexibly selected.

The present invention is not limited to the above embodiments and includes various modifications. For example, the above embodiments are described for easy understanding the present invention, and the invention does not necessarily include all the components described in the embodiments. At least a part of the components described in the embodiments may be changed into another component or deleted. Furthermore, a new component may be also added to the embodiments.

Some or all of the functions, processing, and the like described in the embodiments may be implemented as a hardware circuit or software. The computer program or various pieces of data may be stored in a storing unit external to a computing machine without being limited to the storing unit in the computing machine.

REFERENCE SIGNS LIST

1: Controller, 2: Drive box, 3: Host, 14: Memory, 21: Storing unit, 24: LDEV, 101: Cache management program, 130: Cache memory, 1011: Degeneracy restoration processing section

The invention claimed is:

1. A storage device duplicating and managing cache data, comprising:
multiple controllers each configured to include a cache memory; and
multiple storages used by the controllers and configured with at least one logical volume for being provided to a higher-level device,
wherein:
each of the controllers is configured to hold predetermined management information configured for each logical volume,
the predetermined management information includes:
  face attribute information indicating that the cache memory is used as any of a first face or a second face forming a duplication pair for duplicating and storing cache data,
  a controller number identifying a paired destination controller including a cache memory which forms the duplication pair with the cache memory, and
  transition method information indicating a state transition method of the cache memory,
each of the controllers is configured to invoke a predetermined duplication recovery function in a case where the paired destination controller forming the duplication pair is blocked, to select a new paired destination controller for each logical volume on the basis of the predetermined management information, forward the cache data stored in a cache memory included in the controller itself to the new paired destination controller, and store the cache data in a cache memory included in the new paired destination controller to duplicate and manage the cache data,
the predetermined management information further includes controller selection condition information indicating a condition when selecting the new paired destination controller,
each of the controllers determines the new paired destination controller, a face attribute of a cache memory included in the new paired destination controller, and a face attribute of a cache memory included in an own controller on the basis of the face attribute information, the transition method information, and the controller selection condition information,
each of the controllers can change a face attribute of a cache memory included in an own controller from a current face attribute to determine a face attribute of a cache memory included in the new paired destination controller, and
the controller selection condition information includes a condition that a controller in the controllers is selected of which a cache memory load is equal to or smaller than a predetermined threshold and of which the number of access paths directed to a the storage providing a storing area to the logical volume is the largest.

2. The storage device according to claim 1, wherein
in a case where the first face is used to send and receive data to and from the higher-level device and to and from the storage,
the controller selection condition information includes a condition that in a case where the new paired destination controller used in the first face is selected from the controllers, a controller is selected of which the cache memory load is equal to or smaller than a predetermined threshold and of which a sum of the number of logical paths directed to the logical volume and the number of access paths directed to the storage providing the storing area to the logical volume is the largest.

3. The storage device according to claim 1, wherein the cache memory load being equal to or smaller than a predetermined threshold means that, among the cache data stored in the cache memory, an amount of data which is in a dirty state and is not written in the storage is equal to or smaller than a predetermined threshold.

4. The storage device according to claim 1, wherein each of the controllers, in a case of detecting that a failure occurs in the controller including the cache memory forming the duplication pair, instructs controllers other than the controller detecting the failure to invoke the duplication recovery function.

5. The storage device according to claim 1, wherein each of the controllers, in a case of being blocked due to a maintenance work, instructs all other controllers to invoke the duplication recovery function, confirms that the new paired destination controller is selected for the all controllers each of which includes a cache memory forming the duplication pair with a cache memory included in an own controller and that cache data is duplicated again, and transits to a blocked state in a case where the confirmation is made.

6. A storage device duplicating and managing cache data, comprising:
multiple controllers each configured to include a cache memory; and
multiple storages used by the controllers and configured with at least one logical volume for being provided to a higher-level device,
wherein:
each of the controllers is configured to hold predetermined management information configured for each logical volume,
the predetermined management information includes:
face attribute information indicating that the cache memory is used as any of a first face or a second face forming a duplication pair for duplicating and storing cache data,
a controller number identifying a paired destination controller including a cache memory which forms the duplication pair with the cache memory, and
transition method information indicating a state transition method of the cache memory,
each of the controllers is configured to invoke a predetermined duplication recovery function in a case where the paired destination controller forming the duplication pair is blocked, to select a new paired destination controller for each logical volume on the basis of the predetermined management information, forward the cache data stored in a cache memory included in the controller itself to the new paired destination controller, and store the cache data in a cache memory included in the new paired destination controller to duplicate and manage the cache data,
the predetermined management information further includes controller selection condition information indicating a condition when selecting the new paired destination controller, each of the controllers determines the new paired destination controller, a face attribute of a cache memory included in the new paired destination controller, and a face attribute of a cache memory included in an own controller on the basis of the face attribute information, the transition method information, and the controller selection condition information,
each of the controllers can change a face attribute of a cache memory included in an own controller from a current face attribute to determine a face attribute of a cache memory included in the new paired destination controller,
in a case where the first face is used to send and receive data to and from the higher-level device, and the second face is used to send and receive the data to and from the storage, and
the controller selection condition information includes a condition that:
in a case where the new paired destination controller used in the first face is selected from the controllers, a controller is selected of which the cache memory load is equal to or smaller than a predetermined threshold and of which the number of logical paths directed to the logical volume is the largest, and
in a case where the new paired destination controller used in the second face is selected from the controllers, a controller is selected of which a cache memory load is equal to or smaller than a predetermined threshold and of which the number of access paths directed to a storage unit providing a storing area to the logical volume is the largest.

7. A storage device duplicating and managing cache data, comprising:
multiple controllers each configured to include a cache memory; and
multiple storages used by the controllers and configured with at least one logical volume for being provided to a higher-level device,
wherein:
each of the controllers is configured to hold predetermined management information configured for each logical volume,
the predetermined management information includes:
face attribute information indicating that the cache memory is used as any of a first face or a second face forming a duplication pair for duplicating and storing cache data,
a controller number identifying a paired destination controller including a cache memory which forms the duplication pair with the cache memory, and
transition method information indicating a state transition method of the cache memory,
each of the controllers is configured to invoke a predetermined duplication recovery function in a case where the paired destination controller forming the duplication pair is blocked, to select a new paired destination controller for each logical volume on the basis of the predetermined management information, forward the cache data stored in a cache memory included in the controller itself to the new paired destination controller, and store the cache data in a cache memory included in the new paired destination controller to duplicate and manage the cache data,
the predetermined management information further includes controller selection condition information indicating a condition when selecting the new paired destination controller, each of the controllers determines the new paired destination controller, a face attribute of a cache memory included in the new paired destination controller, and a face attribute of a cache memory included in an own controller on the basis of the face attribute information, the transition method information, and the controller selection condition information, each of the controllers can change a face attribute of a cache memory included in an own controller from a current face attribute to determine a face attribute of a cache memory included in the new paired destination controller, and the controller selection condition information includes a condition that:

in a case where the new paired destination controller used in the first face is selected from the controllers, a controller is selected of which a cache memory load is equal to or smaller than a predetermined threshold and of which a ratio of an area used in the first face in the cache memory is the smallest, and in a case where the new paired destination controller used in the second face is selected from the controllers, a controller is selected of which a cache memory load is equal to or smaller than a predetermined threshold and of which a ratio of an area used in the first face in the cache memory is the smallest.

8. A controlling method of a storage device duplicating and managing cache data,
the storage device including
multiple controllers each configured to include a cache memory, and
multiple storages used by the controllers and configured with at least one logical volume for being provided to a higher-level device,
each of the controllers holding predetermined management information configured for each logical volume,
the predetermined management information including
face attribute information indicating that the cache memory is used as any of a first face or a second face forming a duplication pair for duplicating and storing cache data,
a controller number identifying a controller including a cache memory which forms the duplication pair with the cache memory, and
transition method information indicating a state transition method of the cache memory,
the method comprising:
invoking, in a case where the controller forming the duplication pair is blocked, a predetermined duplication recovery function in all controllers other than a blocked controller, wherein
the predetermined duplication recovery function is to:
select a new paired destination controller for each logical volume on the basis of the predetermined management information,
forward cache data stored in a cache memory to the new paired destination controller and store the cache data in a cache memory included in the new paired destination controller to duplicate and manage the cache data, and
wherein:
the predetermined management information further includes controller selection condition information indicating a condition when selecting the new paired destination controller, each of the controllers determines the new paired destination controller, a face attribute of a cache memory included in the new paired destination controller, and a face attribute of a cache memory included in an own controller on the basis of the face attribute information, the transition method information, and the controller selection condition information, each of the controllers can change a face attribute of a cache memory included in an own controller from a current face attribute to determine a face attribute of a cache memory included in the new paired destination controller, and the controller selection condition information includes a condition that a controller in the controllers is selected of which a cache memory load is equal to or smaller than a predetermined threshold and of which the number of access paths directed to a the storage providing a storing area to the logical volume is the largest.

9. A controller used for a storage device duplicating and managing cache data, comprising:
a front-end port configured to communicate with a higher-level device;
a back-end port configured to communicate with multiple storages which are configured with at least one logical volume for being provided to the higher-level device;
an interconnect port configured to communicate with other controllers;
a cache memory; and
a microprocessor, wherein
the microprocessor holds predetermined management information configured to each logical volume,
the predetermined management information includes:
face attribute information indicating that the cache memory is used as any of a first face or a second face forming a duplication pair for duplicating and storing cache data,
a controller number identifying another controller including a cache memory which forms the duplication pair with the cache memory, and
transition method information indicating a state transition method of the cache memory,
and
the microprocessor is configured to:
select a new paired destination controller for each logical volume on the basis of the predetermined management information in a case where the another controller forming the duplication pair is blocked, and
forward cache data stored in the cache memory to the new paired destination controller and store the cache data in a cache memory included in the new paired destination controller to duplicate and manage the cache data,
wherein each of the controllers, in a case of being blocked due to a maintenance work, instructs all other controllers to invoke the duplication recovery function, confirms that the new paired destination controller is selected for the all controllers each of which includes a cache memory forming the duplication pair with a cache memory included in an own controller and that cache data is duplicated again, and transits to a blocked state in a case where the confirmation is made.

* * * * *